United States Patent
Ter et al.

(10) Patent No.: US 11,716,423 B2
(45) Date of Patent: Aug. 1, 2023

(54) METHOD AND SYSTEM FOR ROBUST WAIT TIME ESTIMATION IN A MULTI-SKILLED CONTACT CENTER WITH ABANDONMENT

(71) Applicant: Genesys Cloud Services, Inc., Menlo Park, CA (US)

(72) Inventors: Wei Xun Ter, Daly City, CA (US); Geir Rosoy, Daly City, CA (US); Mohamed Shahul Hameed, Chennai (IN); Bayu Wicaksono, Daly City, CA (US); Travis Humphreys, Daly City, CA (US); Brian Robinson, Daly City, CA (US)

(73) Assignee: Genesys Cloud Services, Inc., Menlo Park, CA (US)

( * ) Notice: Subject to any disclaimer, the term of this patent is extended or adjusted under 35 U.S.C. 154(b) by 0 days.

(21) Appl. No.: 17/545,191

(22) Filed: Dec. 8, 2021

(65) Prior Publication Data
US 2022/0182493 A1    Jun. 9, 2022

Related U.S. Application Data

(60) Provisional application No. 63/122,905, filed on Dec. 8, 2020.

(51) Int. Cl.
*H04M 3/00* (2006.01)
*H04M 3/523* (2006.01)
*H04M 3/51* (2006.01)

(52) U.S. Cl.
CPC ....... *H04M 3/5238* (2013.01); *H04M 3/5175* (2013.01); *H04M 2203/551* (2013.01)

(58) Field of Classification Search
CPC ............. H04M 3/5238; H04M 3/5175; H04M 2203/551
USPC ....... 379/265.01–265.14, 266.01–266.1, 309
See application file for complete search history.

(56) References Cited

U.S. PATENT DOCUMENTS

| | | | |
|---|---|---|---|
| 6,463,346 B1 * | 10/2002 | Flockhart | G06Q 10/10 379/266.01 |
| 11,178,034 B1 * | 11/2021 | Joshi | H04L 43/091 |
| 2008/0037760 A1 * | 2/2008 | Boughton | H04M 3/5175 379/265.02 |

(Continued)

OTHER PUBLICATIONS

Wikipedia; Normal distribution; available at https://en.wikipedia.org/wiki/Normal_distribution#Quantile_function; last accessed Dec. 7, 2021; 38 pages.

(Continued)

*Primary Examiner* — William J Deane, Jr.
(74) *Attorney, Agent, or Firm* — Taft Stettinius & Hollister LLP

(57) ABSTRACT

A system for estimating a wait time to connect a customer to an agent according to an embodiment includes at least one processor and at least one memory comprising a plurality of instructions stored thereon that, in response to execution by the at least one processor, causes the system to receive incoming interaction data from the customer indicative of a request to estimate the wait time, retrieve historical data indicative of interaction information for one or more interactions that have already been serviced in response to receipt of the request, and generate a wait time estimation based on the historical data.

14 Claims, 13 Drawing Sheets

(56) References Cited

U.S. PATENT DOCUMENTS

| | | | |
|---|---|---|---|
| 2017/0111507 A1 | 4/2017 | McGann et al. | |
| 2019/0213187 A1* | 7/2019 | Sidar | G06F 16/2452 |
| 2020/0334615 A1* | 10/2020 | Benjamin | G06Q 30/016 |
| 2020/0374402 A1 | 11/2020 | Adibi | |

OTHER PUBLICATIONS

Ibrahim, Rouba et al.; Real-Time Delay Estimation Based on Delay History in Many-Server Service Systems with Time-Varying Arrivals; Production and Operations Management; 2011; pp. 654-667; vol. 20, No. 5; Production and Operations Management Society.
International Search Report and Written Opinion of the International Searching Authority; ISA/US; International Application No. PCT/US2021/062346; dated Feb. 16, 2022; 8 pages.

* cited by examiner

METHOD AND SYSTEM FOR ROBUST WAIT TIME ESTIMATION IN A MULTI-SKILLED CONTACT CENTER WITH ABANDONMENT

CROSS-REFERENCE TO RELATED APPLICATIONS

This application claims priority to U.S. Provisional Patent Application Ser. No. 63/122,905 filed on Dec. 8, 2020, the contents of which are incorporated herein by reference in their entirety.

BACKGROUND

Contact centers typically distribute incoming interactions among available agents suited to handle the particular interactions. However, when all agents are unavailable, incoming interactions may be placed in one or more queues to wait for the next available agent. Longer wait times may lead to customers abandoning communication or communicating less effectively when eventually connected with agents. Consequently, excessive wait times may diminish customer satisfaction and reduce service quality in detriment to the operation of a call center.

In operation of contact centers, wait time information for particular interactions facilitates handling of the interactions and promotes higher quality customer service. Various systems and methodologies to provide wait time information to customers during periods of agent unavailability suffer from a number of drawbacks, such as undesirable accuracy, inadequate consideration of customer behaviors during wait periods, the multi-faceted nature of the particular contact center environment, and limitations associated with certain statistical approximations, just to name a few.

SUMMARY

One embodiment is directed to a unique system, components, and methods for estimating wait time to connect a customer to an agent. Other embodiments are directed to apparatuses, systems, devices, hardware, methods, and combinations thereof for estimating contact center wait times.

According to an embodiment, a system for estimating a wait time to connect a customer to an agent may include at least one processor and at least one memory comprising a plurality of instructions stored thereon that, in response to execution by the at least one processor, causes the system to receive incoming interaction data from the customer indicative of a request to estimate the wait time, to retrieve historical data indicative of interaction information for one or more interactions that have already been serviced in response to receipt of the request, and to generate a wait time estimation based on the historical data.

In some embodiments, the interaction data may include a plurality of route paths each defined by one or more of a media type associated with the request, data stored in a queue that is associated with one or more previous interactions, a language associated with the request, one or more skill requirements associated with the request, a position of the request in the queue, a number of agents available to service the queue, a time of the request, or a time of service of the request.

In some embodiments, in response to execution by the at least one processor, the plurality of instructions may cause the system to maintain a waiting cache for each of the plurality of route paths to store interaction data associated with one or more interactions that have yet to be serviced and to maintain a completed cache for each of the plurality of route paths to store interaction data associated with one or more interactions that have already been serviced.

In some embodiments, to generate the wait time estimation based on the historical data may include to determine an actual wait time corresponding to one or more interactions that have already been serviced, to determine a position in queue of one or more interactions that have already been serviced, to determine a number of available agents corresponding to one or more interactions that have already been serviced, and to calculate an adjusted average handle time corresponding to one or more interactions that have already been serviced based on the determined actual wait time, the determined position in queue, and the determined number of available agents.

In some embodiments, to generate the wait time estimation based on the historical data may include to calculate an average handle time estimator based on one or more of a median of adjusted average handle time calculations or an average of adjusted average handle time calculations.

In some embodiments, to generate the wait time estimation based on the historical data may include to determine a position in queue corresponding to the request, to determine a number of available agents corresponding to the request, and to calculate the wait time estimation based on the average handle time estimator, the determined position in queue corresponding to the request, and the determined number of available agents corresponding to the request.

In some embodiments, to generate the wait time estimation based on the historical data may include to calculate an estimation interval of wait time.

In some embodiments, to calculate the estimation interval of wait time may include to determine a sample number of one or more interactions that have already been serviced, to determine a statistical significance level associated with the estimation interval, to determine a quantile value for a lower bound of the estimation interval, to determine a quantile value for an upper bound of the estimation interval, to calculate the lower bound of the estimation interval based at least partially on an adjusted average handle time corresponding to the determined lower bound quantile value, and to calculate the upper bound of the estimation interval based at least partially on an adjusted average handle time corresponding to the determined upper bound quantile value.

In some embodiments, in response to execution by the at least one processor, the plurality of instructions may cause the system to determine whether a number of conversations stored in a waiting cache having no actual wait time exceeds a reference value, to determine whether a conversation identifier associated with an incoming conversation already exists in the waiting cache, and to exclude the incoming conversation from the waiting cache in response to a determination that the number of conversations stored in the waiting cache having no actual wait time exceeds the reference value or in response to a determination that the conversation identifier already exists in the waiting cache.

According to another embodiment, one or more non-transitory machine-readable storage media may include a plurality of instructions stored thereon that, in response to execution by at least one processor, causes a system to receive incoming interaction data from a customer indicative of a request to estimate a wait time to connect the customer to an agent, to retrieve historical data indicative of interaction information for one or more interactions that have already been serviced in response to receipt of the request, and to generate a wait time estimation based on the historical data to connect the customer to the agent.

In some embodiments, the interaction data may include a plurality of route paths each defined by one or more of a media type associated with the request, data stored in a queue that is associated with one or more previous interactions, a language associated with the request, one or more skill requirements associated with the request, a position of the request in the queue, a number of agents available to service the queue, a time of the request, or a time of service of the request.

In some embodiments, to generate the wait time estimation based on the historical data may include to determine an actual wait time corresponding to one or more interactions that have already been serviced, to determine a position in queue of one or more interactions that have already been serviced, to determine a number of available agents corresponding to one or more interactions that have already been serviced, and to calculate an adjusted average handle time corresponding to one or more interactions that have already been serviced based on the determined actual wait time, the determined position in queue, and the determined number of available agents.

In some embodiments, to generate the wait time estimation based on the historical data may include to calculate an average handle time estimator based on one or more of a median of adjusted average handle time calculations or an average of adjusted average handle time calculations.

In some embodiments, to generate the wait time estimation based on the historical data may include to determine a position in queue corresponding to the request, to determine a number of available agents corresponding to the request, and to calculate the wait time estimation based on the average handle time estimator, the determined position in queue corresponding to the request, and the determined number of available agents corresponding to the request.

In some embodiments, to generate the wait time estimation based on the historical data may include to calculate an estimation interval of wait time, and to calculate the estimation interval of wait time may include to determine a sample number of one or more interactions that have already been serviced, to determine a statistical significance level associated with the estimation interval, to determine a quantile value for a lower bound of the estimation interval, to determine a quantile value for an upper bound of the estimation interval, to calculate the lower bound of the estimation interval based at least partially on an adjusted average handle time corresponding to the determined lower bound quantile value, and to calculate the upper bound of the estimation interval based at least partially on an adjusted average handle time corresponding to the determined upper bound quantile value.

In some embodiments, in response to execution by the at least one processor, the plurality of instructions may cause the system to determine whether a number of conversations stored in a waiting cache having no actual wait time exceeds a reference value, to determine whether a conversation identifier associated with an incoming conversation already exists in the waiting cache, and to exclude the incoming conversation from the waiting cache in response to a determination that the number of conversations stored in the waiting cache having no actual wait time exceeds the reference value or in response to a determination that the conversation identifier already exists in the waiting cache.

According to yet another embodiment, a method of estimating a contact center wait time to connect a customer to an agent may include receiving, by a contact center system, incoming interaction data from the customer indicative of a request to estimate the wait time, retrieving, by the contact center system, historical data indicative of interaction information for one or more interactions that have already been serviced in response to receipt of the request, and generating, by the contact center system, a wait time estimation based on the historical data.

In some embodiments, the interaction data may include a plurality of route paths each defined by one or more of a media type associated with the request, data stored in a queue that is associated with one or more previous interactions, a language associated with the request, one or more skill requirements associated with the request, a position of the request in the queue, a number of agents available to service the queue, a time of the request, or a time of service of the request.

In some embodiments, generating the wait time estimation based on the historical data may include determining, by the contact center system, an actual wait time corresponding to one or more interactions that have already been serviced, determining, by the contact center system, a position in queue of one or more interactions that have already been serviced, determining, by the contact center system, a number of available agents corresponding to one or more interactions that have already been serviced, and calculating, by the contact center system, an adjusted average handle time corresponding to one or more interactions that have already been serviced based on the determined actual wait time, the determined position in queue, and the determined number of available agents.

In some embodiments, generating the wait time estimation based on the historical data may include calculating, by the contact center system, an average handle time estimator based on a median of adjusted average handle time calculations or based on an average of adjusted average handle time calculations, determining, by the contact center system, a position in queue corresponding to the request, determining, by the contact center system, a number of available agents corresponding to the request, and calculating, by the contact center system, the wait time estimation based on the average handle time estimator, the determined position in queue corresponding to the request, and the determined number of available agents corresponding to the request.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
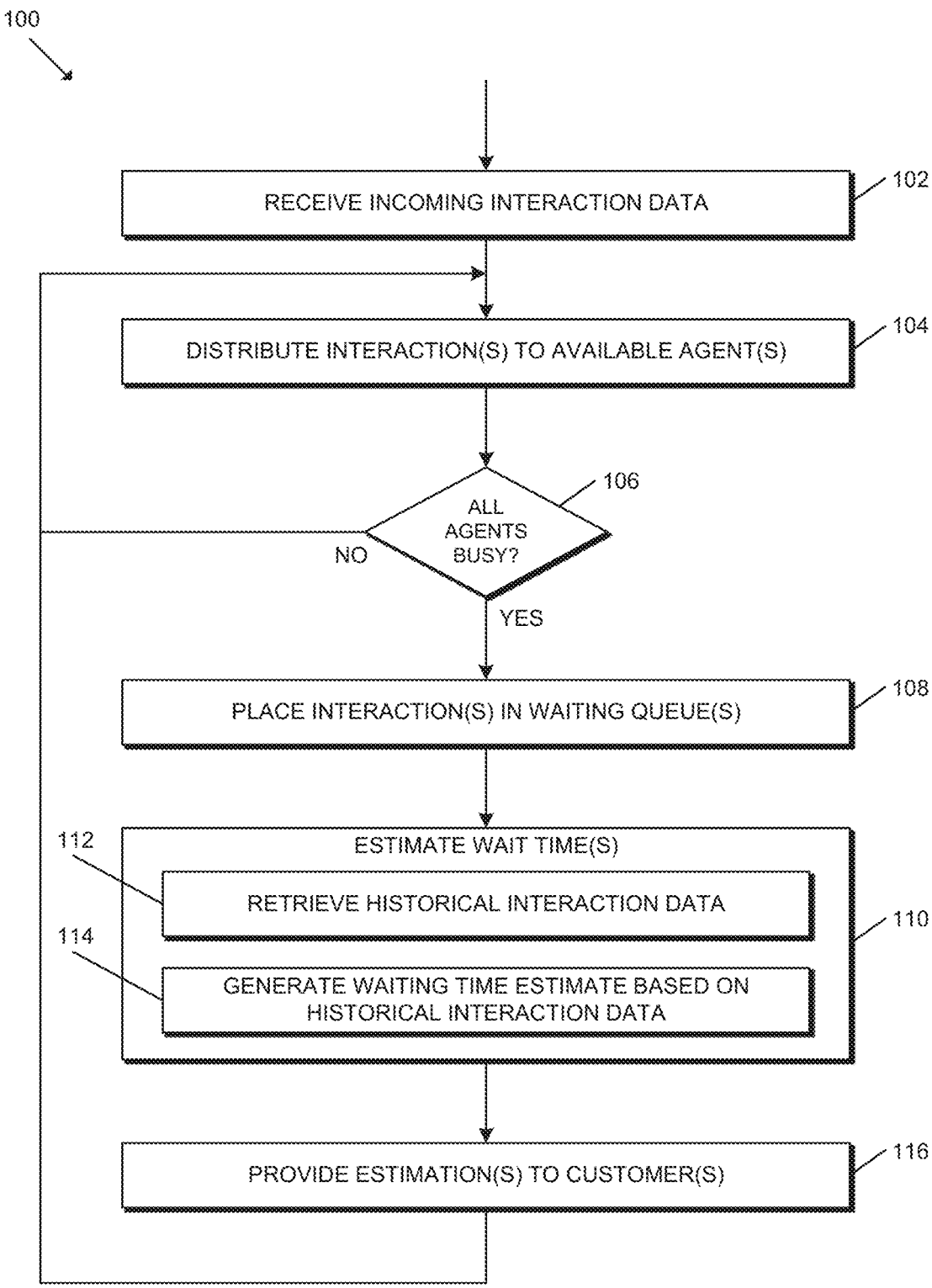
FIG. 1 is a simplified flow diagram of at least one embodiment of a method of estimating contact center wait time.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The present disclosure provides a number of unique approaches to accurately and robustly predict how long an interaction or conversation may wait in a queue before being connected to an agent. As further described below, in at least some embodiments, the systems and methodologies described herein account for a number of pertinent factors, such as the skill requirements of the interaction, the urgency of the interaction (e.g., a voice interaction may take priority over an email interaction), interaction synchrony (e.g., more than one interaction may be handled by one agent), and agent skill (e.g., a multi-skilled agent may be active in multiple queues), for example.

Current methods and configurations which may be employed in an Automatic Call Distribution (ACD) system to provide wait time information to customers during periods of agent unavailability may fail to provide a desired degree of accuracy and/or precision. In particular, those methods and configurations may fail to account for a variety of factors pertinent to a customer-agent interaction that impact wait time. Those factors include, but are not limited to, incidences of abandonment, interaction priority/urgency, customer tolerance of waiting, and the multi-skilled nature of a contact center environment where agents can handle multiple interactions and be active in multiple queues. Additionally, some methods and configurations may utilize estimations based on average values that fail to accurately approximate actual wait times.

Due to the complexity and difficulty of factoring in individual factors and/or variables, the robust estimation framework presented herein utilizes information from previously serviced interactions coupled with information about the current state of the system, as well as a feedback mechanism that learn from changes in system resources and assumptions. It should be appreciated that an estimation framework providing more accurate wait time predictions (e.g., point value estimations and/or estimation intervals) facilitates reliable decision-making and enhanced responsiveness to customer interactions. Such predictions may also direct preemptive call-backs to customers and the provision of alternative contact channels to handle customer interactions should wait times exceed certain thresholds. Additionally, the wait time estimation framework provided by the systems and methods of the present disclosure may enable contact centers to manage agent queue activations with increased confidence between a network of queues to optimize operation toward lower wait times.

In at least some embodiments, estimation of wait time according to the systems and methods disclosed herein includes calculating point value estimations of wait time using parameters extracted through a series of historical wait time observations based on previously serviced interactions and calculating estimations of wait time using estimation intervals. In some embodiments, a wait time estimation is provided as an interval T=[t1, t2] and the real/actual value of wait time should fall in the interval T with high or relatively high probability. Additionally, in some embodiments, three types of intervals are considered to determine the interval T: (i) $T_1=(-\infty, t_2]$; (ii) $T_2=[t_1, +\infty)$; and (iii) $T_3=[t_1, t_2]$.

For the purposes of the present disclosure, the definitions provided below are applicable to subsequent discussion of the defined terms.

Queue ID—The unique identifier representing the particular queue.
Media Type—The media type that a particular interaction is classified into.
Conversation ID—The unique identifier representing a current interaction.
Skills Set ID—The unique set of skills identifier associated with the current interaction which serves as a requirement for an agent to handle the interaction.
Queue Length (n)—The number of interactions currently waiting in the queue.
Position in Queue (PiQ)—The position of the current interaction in queue (equal to n+1).
Agent/Server Count (S)—An integer value representative of the total number of agents available. Available agents are agents activated on the queue, and available agents may be either busy/unavailable or idle.
Initial Time Stamp—The time stamp representing the time at which the interaction is placed in a cache.
Serviced Time Stamp—The time stamp representing the time at which the interaction is answered/serviced by an agent.
Actual Wait Time (AWT)—The time elapsed (e.g., in seconds) between when the EWT calculation is performed and when an agent answers/services the conversation. Note that the AWT is not representative of the actual total wait time for a conversation after entering queue.
Estimated Wait Time (EWT)—The estimation of AWT (e.g., in the form of a point value estimate or an estimation interval).
Average Handle Time (AHT)—The average agent service time for handling interactions.
Adjusted AHT—The adjusted handle time calculated for each interaction which factors in various effects and is used to predict subsequent new estimates.

It should be appreciated that PiQ, as described above, may be determined in different ways depending on the use case. When estimating wait time for a conversation, the conversation's current position in queue is used to determine PiQ. However, when estimating wait time for a specific media type, PiQ may be determined by looking at the queue length (n)+1 as if estimating for a conversation that just entered the queue with position=queue length (n)+1.

As background, some approaches for calculating EWT are based on queuing theory. It is typically accepted that the time until service completion (service time) is exponentially distributed with mean equal to $1/\mu$, or in the case of multiple servers, mean equal to $1/S\mu$, where S represents number of servers and $\mu$ represents rate of service. When all servers are busy, a new interaction must wait in queue until an interaction currently handled by a server is serviced and the n number of interactions in front of it have been serviced/answered. Therefore, the waiting time of the new interaction may be expressed as the sum of n+1 independent and identically Distributed (IID) exponential random variables, each with mean $1/S\mu$ having an Erlang distribution. For the purposes of the present disclosure, EWT may be a random variable describing the waiting time of interest.

EWT may be expressed and/or determined according to mathematical relationship (1) set forth below.

$$EWT = \frac{n+1}{S\mu} \quad (1)$$

In relationship (1), $1/\mu$=AHT and n+1=PiQ. As such, EWT may also be expressed and/or determined according to mathematical relationship (2) below.

$$EWT = \frac{AHT \times PiQ}{S} \quad (2)$$

In some cases, it may be desirable to evaluate the precision of the EWT values as measured by confidence intervals. To that end, estimated wait time intervals may be used to provide a range of values likely to contain the actual wait time (AWT) for a particular interaction in the queue.

For ease of explanation, one may consider wait time in a queue as a random variable $\tau$ with a certain probability distribution. Interval T should satisfy the condition $P(\tau \in T) = \gamma$, where $\gamma$ is expressed in percent is close to 100%. In many cases, $\gamma$ may be written as $\gamma=1-\alpha$, where $\alpha$ is close to zero. Typical values for $\alpha$ (which may be referred to herein as the significance level associated with an estimated wait time interval) may be 1%, 5%, or 10%, at least in some embodiments.

One may also suppose that Q(p) is a p-quantile of $\tau$. Based on that assumption, the interval estimates for EWT can be presented as follows:

1. An upper or lower interval given by the upper and lower bounds, respectively:

$(-\infty, Q_{1-\alpha/2}]$     (a)

$[Q_{\alpha/2}, +\infty)$     (b)

2. A two-sided interval given by the lower and upper bound for the interval $$[Q_{\alpha/2}, Q_{1-\alpha/2}] \quad (c)$$

As mentioned above as background for the discussion of relationship (1), since the inherent distribution is Erlang, the quantile cannot be easily presented analytically. There are several numerical methods to estimate Q(p) in this form, which is related to finding the route of equation: $F(x)-\gamma=0$, where F(x) is the cumulative probability distribution function.

The wait time in a queue may be a sum of n wait times until the next ready agent in a group. If queue length n is of a large number, normal approximation can be used for the probability distribution oft. In one approach, mean and standard deviation values could be taken from the Erlang distribution. In another approach, mean and standard deviation values could be estimated from a sample of real data.

Referring now to FIG. 1, in use, a system may execute a method 100 of estimating contact center wait time. It should be appreciated that, in some embodiments, the system may be embodied as a computing device (e.g., the computing device 1100 of FIG. 11) and/or a contact center system (e.g., the contact center system 1000 of FIG. 10) or a system/device thereof. It should also be appreciated that the particular blocks of the method 100 are illustrated by way of example, and such blocks may be combined or divided, added or removed, and/or reordered in whole or in part depending on the particular embodiment, unless stated to the contrary.

The illustrative method 100 begins with block 102 in which the system receives incoming interaction data from one or more customers. In the illustrative embodiment, the incoming interaction data includes, or is otherwise embodied as, automatic call distribution (ACD) data. In some examples, the incoming interaction data includes contact volume, average handle time (AHT), full time equivalency (FTE), capture rate, contact handling data for contact types, contact handling data for staffing types, and/or other relevant ACD data for a specified interval. Additionally, in some examples, the interaction data includes one or more route paths each defined by one or more of a media type associated with the incoming interaction data, data stored in a queue that is associated with one or more previous interactions, a language associated with the incoming interaction data, one or more skill requirements associated with the incoming interaction data, a position of the incoming interaction data in the queue, a number of agents available to service the queue, a time of the incoming interaction data, a time of service of the incoming interaction data, or any additional route dimension. As described below, it should be appreciated that, at least in some embodiments, the incoming interaction data received in block 102 is indicative of a request to estimate wait time to connect the customer to an available agent.

From block 102, the illustrative method 100 proceeds to block 104 in which the system distributes one or more interactions to one or more available agents activated on the queue. As mentioned above, available agents activated on the queue may be either idle or busy. The method 100 proceeds to block 106 from block 104.

In block 106, the system determines whether all available agents are busy. If the system determines that all available agents are busy, the method 100 proceeds to block 108.

In block 108, the system places the one or more interactions associated with the incoming interaction data in one or more waiting queues. As evident from the discussion that follows, one or more interactions placed in the one or more waiting queues may be stored in one or more caches, such as the caches described below with reference to FIGS. 5 and 6, for example. Regardless, from block 108, the illustrative method 100 proceeds to block 110.

In block 110, the system estimates one or more wait times for the one or more interactions associated with the incoming interaction data. To do so, in the illustrative embodiment, the system performs blocks 112 and 114. In block 112, the system retrieves historical interaction data indicative of interaction information for one or more interactions that have already been serviced, as further described below with reference to FIG. 3. In block 114, the system generates one or more wait time estimations based on the historical interaction data. At least in some embodiments, the wait time estimation(s) associated with block 114 may be generated according to the method 300 of FIGS. 3 and 4. Additionally, in at least some embodiments, the wait time estimation(s) associated with block 114 account for one or more of a media type associated with the incoming interaction data, data stored in a queue that is associated with one or more previous interactions, a language associated with the incoming interaction data, one or more skill requirements associated with the incoming interaction data, a position of the incoming interaction data in the queue, a number of agents available to service the queue, a time of the incoming interaction data, a time of service of the incoming interaction data, or any additional route dimension. From block 110, the illustrative method 100 proceeds to block 116.

In block 116, the system provides the wait time estimation(s) generated in block 110 to one or more customers. From block 116, the method 100 returns to block 104.

Returning to block 106, if the system determines that all available agents are not busy, the method 100 returns to block 104.

Although the blocks 102-116 are described in a relatively serial manner, it should be appreciated that various blocks of the method 100 may be performed in parallel in some embodiments.

Figure 2:
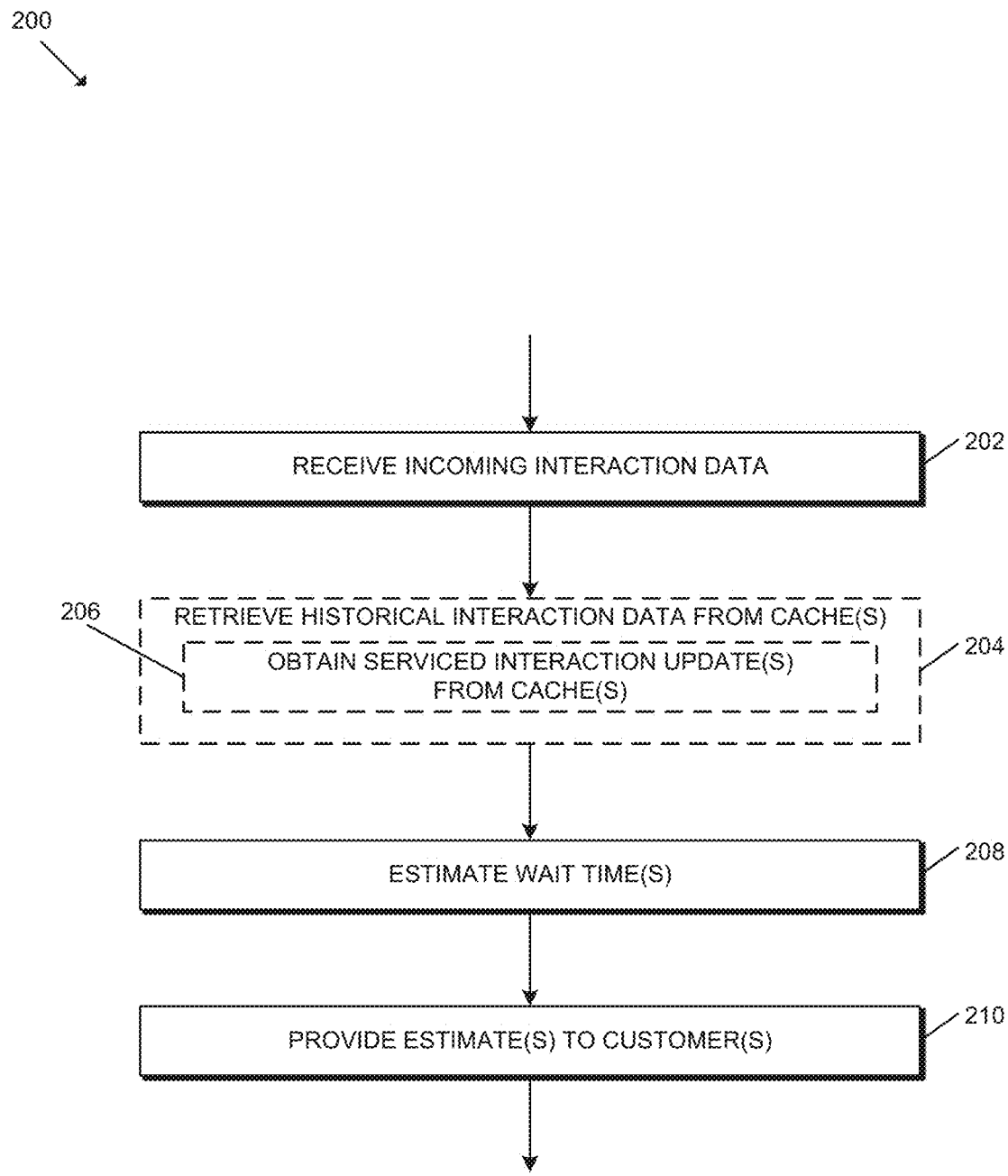
FIG. 2 is a simplified flow diagram of another embodiment of a method of estimating contact center wait time.

Referring now to FIG. 2, in use, a system may execute a method 200 of estimating contact center wait time. In view of the discussion that follows, it should be appreciated that the method 200 may be similar to the method 100. It should also be appreciated that, in some embodiments, the system may be embodied as a computing device (e.g., the computing device 1100 of FIG. 11) and/or a contact center system (e.g., the contact center system 1000 of FIG. 10) or a system/device thereof. Furthermore, it should also be appreciated that the particular blocks of the method 200 are illustrated by way of example, and such blocks may be combined or divided, added or removed, and/or reordered in whole or in part depending on the particular embodiment, unless stated to the contrary.

The illustrative method 200 begins with block 202 in which the system receives incoming interaction data from one or more customers. The incoming interaction data received in block 202 may be similar to the incoming interaction data received in block 102. From block 202, the method 200 proceeds to block 204.

In some embodiments, in block 204, the system may retrieve historical interaction data from one or more caches. The historical interaction data retrieved in block 204 may be similar to the historical interaction data retrieved in block 112. In at least some embodiments, in block 204, historical interaction data may be retrieved from the caches described below with reference to FIGS. 5 and 6. In any case, to perform block 204, the system illustratively performs block 206. In block 206, the system may obtain information updates from one or more caches based on one or more previously serviced interactions. Dashed illustration of the blocks 204 and 206 in FIG. 2 is intended to convey data flow that is updated based on historical data (i.e., previously serviced interactions) stored in the caches. From block 204, the illustrative method 200 proceeds to block 208.

In block 208, the system estimates one or more wait times for the one or more interactions associated with the incoming interaction data. Wait time estimation performed in block 208 may be similar to wait time estimation performed in block 110. From block 208, the illustrative method 200 proceeds to block 210.

In block 210, the system provides the wait time estimation(s) generated in block 208 to one or more customers. Provision of the wait time estimations(s) in block 210 may be similar to provision of the wait time estimation(s) in block 116.

Although the blocks 202-210 are described in a relatively serial manner, it should be appreciated that various blocks of the method 200 may be performed in parallel in some embodiments.

Figure 3:
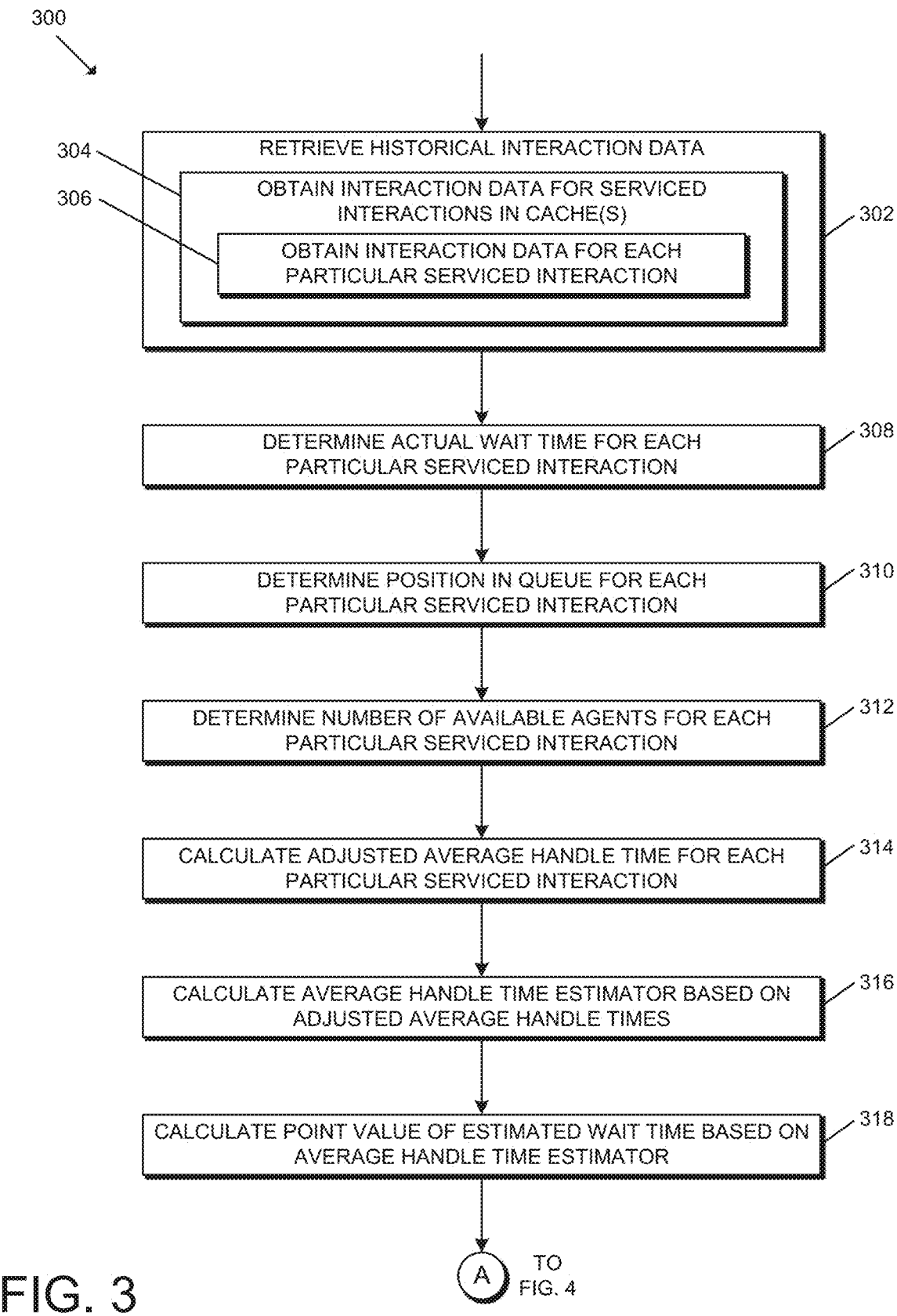
FIG. 3 is a simplified flow diagram of yet another embodiment of a method of estimating contact center wait time that includes calculating a point value of estimated wait time.
Figure 4:
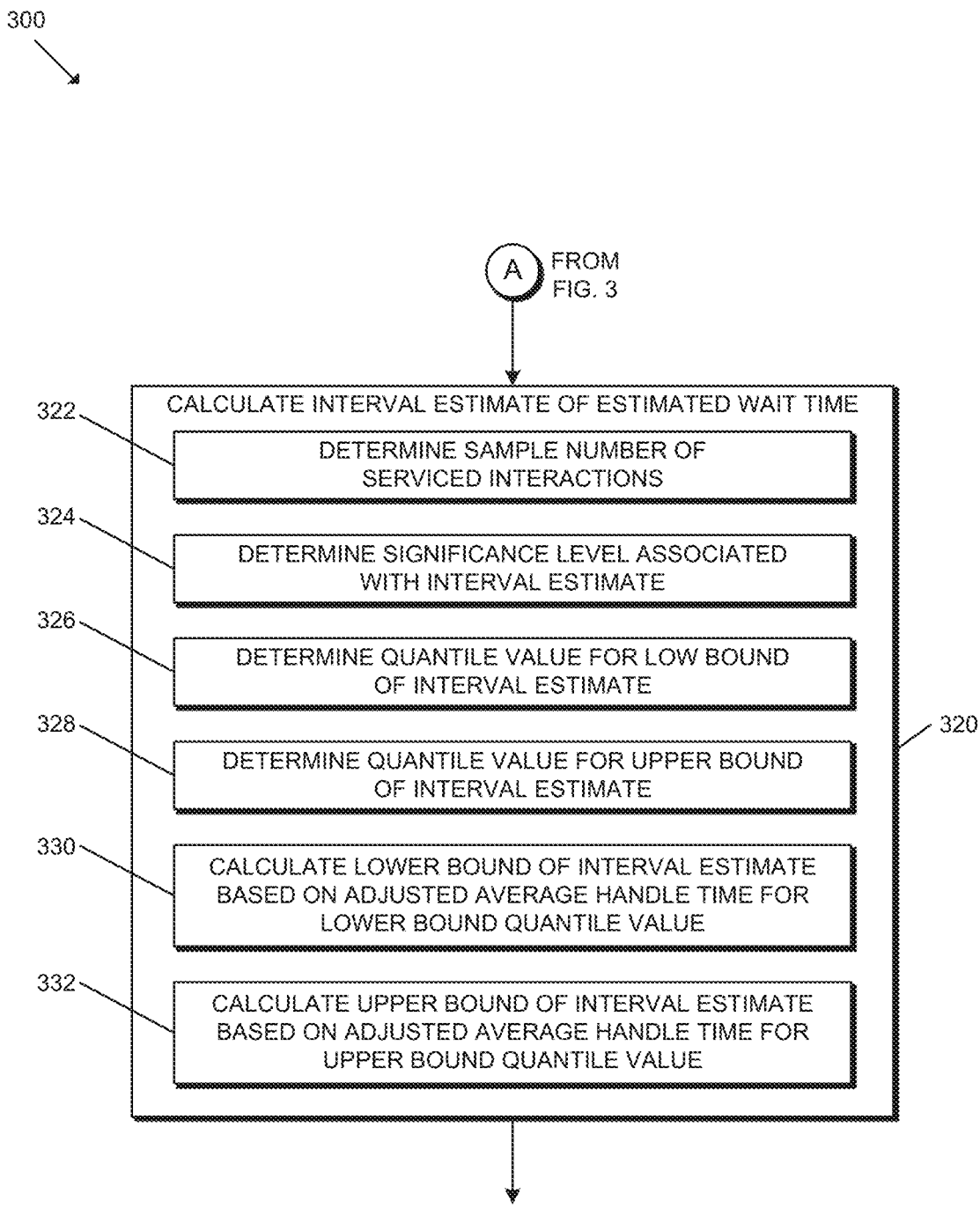
FIG. 4 is a simplified flow diagram of the method of FIG. 3 that includes calculating an interval of estimated wait time.

Referring now to FIGS. 3 and 4, in use, a system may execute a method 300 of estimating contact center wait time. In some embodiments, to perform blocks 110 and 208, the method 300 may be performed. It should also be appreciated that, in some embodiments, the system may be embodied as a computing device (e.g., the computing device 1100 of FIG. 11) and/or a contact center system (e.g., the contact center system 1000 of FIG. 10) or a system/device thereof. Furthermore, it should also be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which the system retrieves historical interaction data in response to receiving incoming interaction data from one or more customers. The historical interaction data retrieved in block 302 may be similar to the historical interaction data retrieved in block 112. In the illustrative embodiment, to perform block 302, the system performs blocks 304 and 306. In block 304, the system obtains interaction data for a number of previously serviced recent interactions stored in caches (e.g., the completed cache described below with reference to FIG. 6). In block 306, the system obtains interaction data for each particular interaction of the previously serviced recent interactions for which interaction data is obtained in block 304. In some embodiments, each previously serviced recent interaction for which interaction data is obtained in block 306 may correspond to an interaction in the queue having a nonzero wait time. From block 302, the method 300 proceeds to block 308.

In block 308, the system determines the AWT for each particular serviced recent interaction for which interaction data is obtained in block 302. Each particular serviced recent interaction for which the AWT is calculated in block 308, and for which other calculations/determinations are made as discussed below, may be referred to herein as the "ith" interaction.

It should be appreciated that to calculate a wait time estimation according to the relationships (1) and (2) mentioned above, states of AHT, PiQ, and S need to be estimated. In some cases, the states of PiQ and S may be observed relatively easily, where PiQ is the depth or length of the queue, and S is the count of agent(s) serving the queue. Due to the transient state of the AHT variable, that variable cannot be known a priori. Consequently, some approaches rely on an average of past service time to provide an estimation of the AHT variable.

Of course, in a real contact center setting, average service times are often affected by other factors that may change frequently based on specific situations, such as, for example, incidences of abandonment, agent efficiency, interaction concurrency, and agent availability. As such, more accurate estimations of AHT may be made from recently serviced interactions.

In the illustrative embodiment, to estimate the AHT as further discussed below, the Adjusted AHT ($AHT^{adj}$) is collected from a sample corresponding to the ith most recent interaction(s) having nonzero waiting time in the queue. For each of those interactions, the Actual Wait Time (AWT), as well as the number of agent(s) and the position in queue when the ith interaction(s) first enter the queue, is calculated by the system in block 308.

Performing various substitutions in relationship (2) mentioned above, the nonzero AWT of the ith interaction (i.e., where i=1, . . . , n) may be expressed and/or determined according to relationship (3) below.

$$AWT_i = \frac{AHT_i^{adj} \times PiQ_i}{S_i} \quad (3)$$

Therefore, in the illustrative embodiment, the system makes the AWT determination for each ith interaction in block 308 according to relationship (3).

From block 308, the illustrative method 300 proceeds to block 310. In block 310, the system determines the position in queue ($PiQ_i$) for each ith interaction. From block 310, the method 300 proceeds to block 312.

In block 312, the system determines the number of available agents ($S_i$) for each ith interaction. From block 312, the method 300 proceeds to block 314.

In block 314, the system calculates an adjusted average handle time ($AHT_i^{adj}$) for each ith interaction. In view of the relationship (3) indicated above, the system performs the $AHT_i^{adj}$ calculation for each ith interaction in block 314 according to mathematical relationship (4) below.

$$AHT_i^{adj} = \frac{AWT_i \times S_i}{PiQ_i} \quad (4)$$

From block 314, the illustrative method 300 proceeds to block 316. In block 316, the system calculates an average handle time estimator ($AHT\hat{}$) based on multiple values for $AHT_i^{adj}$ calculated in block 314. The illustrative $AHT\hat{}$ is determined according to the median or the average of the calculations performed in block 314. That is, the $AHT\hat{}$ is expressed and/or determined in block 316 according to mathematical relationship (5) below.

$$AHT\hat{} = \text{Median or average of sample Adjusted AHTs} \quad (5)$$

It should be appreciated that when there are a substantial number of recently serviced interactions, the median of the $AHT_i^{adj}$ calculations performed in block 314 may be preferred to the average of those calculations (i.e., in block 316) because the median is a more robust estimator having more resistance to outliers. However, if less than or equal to three calculations are performed in block 314, the average of those calculations may be preferred over the median in block 316. In some embodiments, another statistically sound estimator (e.g., a weighted average, an exponential weighted average with a decay mechanism, etc.) may be used in lieu of the average or the median.

From block 316, the illustrative method 300 proceeds to block 318. In block 318, the system calculates a point value of estimated wait time (EWT) based at least partially on the AHT^ calculated in block 316. More specifically, the system calculates EWT in block 318 according to mathematical relationship (6) below.

$$EWT_{current} = \frac{AHT^\wedge \times PiQ_{current}}{S_{current}} \quad (6)$$

In at least some embodiments, the "current" subscripts in relationship (6) refer to determinations which are made by the system for the latest incoming or current interaction in the queue, and which may correspond to a request to estimate wait time for the latest incoming or current interaction. It should be appreciated that as more and more interactions are processed through the queue, the $AHT_i^{adj}$ will vary accordingly. That variance is advantageous to capture changes and fluctuations in the factors that impact the wait time estimations, such as the factors discussed above with reference to block 110, for instance.

Referring now to FIG. 4, in the illustrative embodiment, from block 318, the method 300 proceeds to block 320 in which the system calculates an interval estimation of wait time. To perform block 320, the system illustratively performs blocks 322, 324, 326, 328, 330, 332, which are described in greater detail below. At a high level, it should be appreciated that performance of block 320 incorporates various aspects of the point value estimation approach discussed above with reference to blocks 308-318.

As background for the interval estimation of wait time calculated in block 320, one may consider that order statistics $AdjAHT_{(k)}$ of the sample of n interactions can be used as an approximation for the adjusted average handle time parameter (i.e., $AHT^{adj}$) according to relationship (7) below.

$$AHT^{adj} = \{AHT_i^{adj}, i=1,\ldots,n\} \quad (7)$$

For example, if there are 19 observations, the order statistic $$AHT_{19}^{adj} = \max_i(AHT_i^{adj})$$

can be used as an approximation of quantile Q(95%). Whereas $$AHT_1^{adj} = \min_i(AHT_i^{adj})$$

approximates quantile Q(5%). Hence, for interval estimate for $AHT^{adj}$, the interval will be $[AHT_1^{adj}, AHT_{19}^{adj}]$ when α=10%.

Finally, to provide a two-sided interval, multiply $AHT_k^{adj}$ by position in queue PiQ and divide by the number of agents S according to relationship (8) below.

$$\text{two sided interval} = \left[\frac{AHT_{k_1}^{adj} \times PiQ}{S}, \frac{AHT_{k_2}^{adj} \times PiQ}{S}\right] \quad (8)$$

In relationship (8), $k_1$, $k_2$ correspond to desired values of quantiles which can be achieved for the upper or lower bounds of the interval. This approach can be easily extended to other values of n observations and other significance levels α.

Returning to illustrative block 320, performance thereof by the system includes performance of blocks 322, 324, 326, 328, 330, 332 as indicated above. In block 322, the system determines a sample number of one or more interactions that have already been serviced. In at least some embodiments, the sample of serviced interaction(s) may be drawn from serviced interactions stored in the completed cache described below with reference to FIG. 6. In block 324, the system determines a statistical significance level (α) associated with the estimation interval. In block 326, the system determines a quantile value for a lower bound of the estimation interval. In block 328, the system determines a quantile value for an upper bound of the estimation interval. In block 330, the system calculates the lower bound of the estimation interval based at least partially on an adjusted average handle time corresponding to the determined lower bound quantile value. In at least some embodiments, the adjusted average handle time corresponding to the determined lower bound quantile value is based on the variable $AHT_{k_1}^{adj}$ contained in relationship (8), and the lower bound of the estimation interval is determined according to relationship (8). In block 332, the system calculates the upper bound of the estimation interval based at least partially on an adjusted average handle time corresponding to the determined upper bound quantile value. In at least some embodiments, the adjusted average handle time corresponding to the determined upper bound quantile value is based on the variable $AHT_{k_2}^{adj}$ contained in relationship (8), and the upper bound of the estimation interval is determined according to relationship (8).

Although the blocks 302-332 are described in a relatively serial manner, it should be appreciated that various blocks of the method 300 may be performed in parallel in some embodiments.

Figure 5:
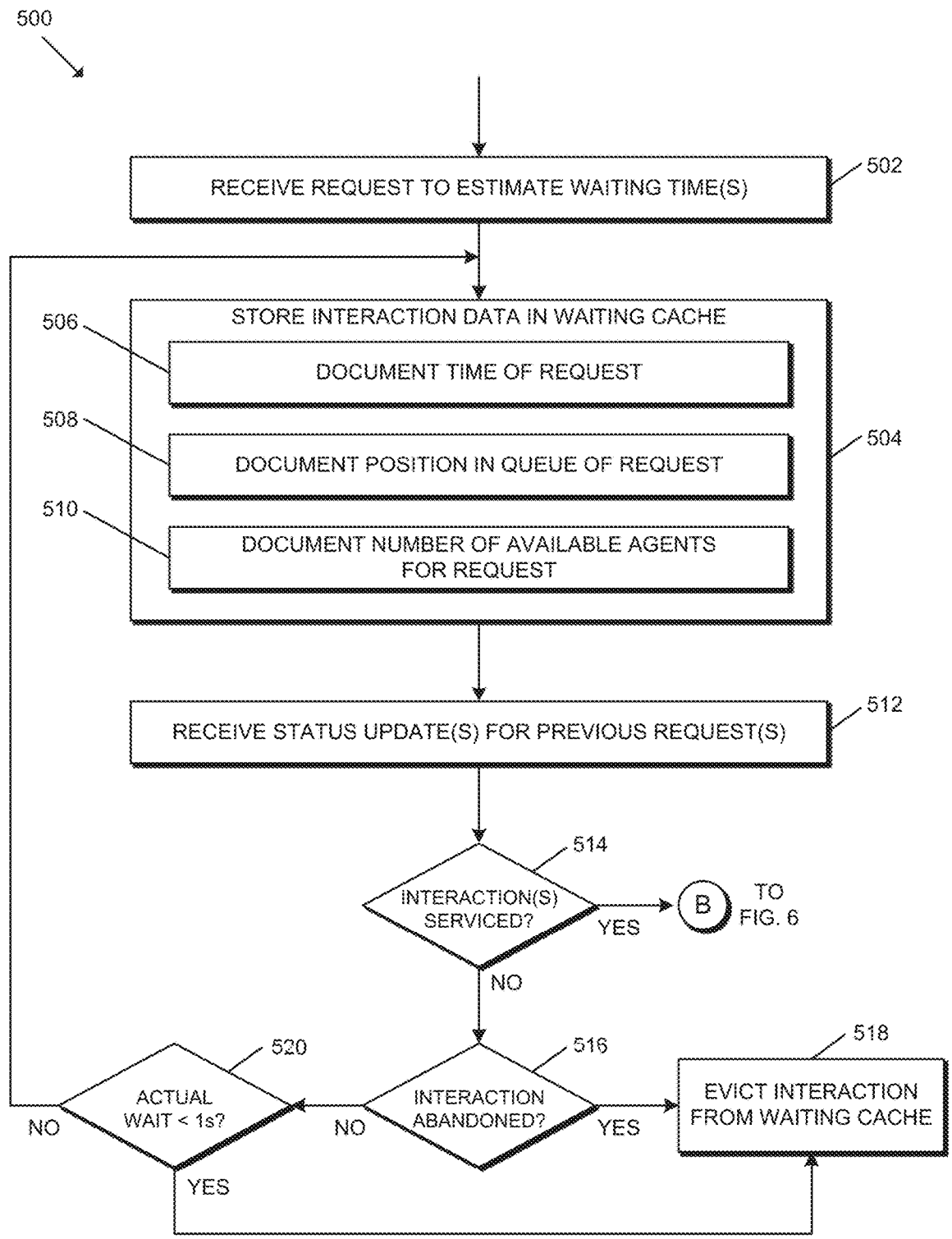
FIG. 5 is a simplified flow diagram of yet another embodiment still of a method of estimating contact center wait time that includes selectively evicting one or more interactions from a waiting cache.
Figure 6:
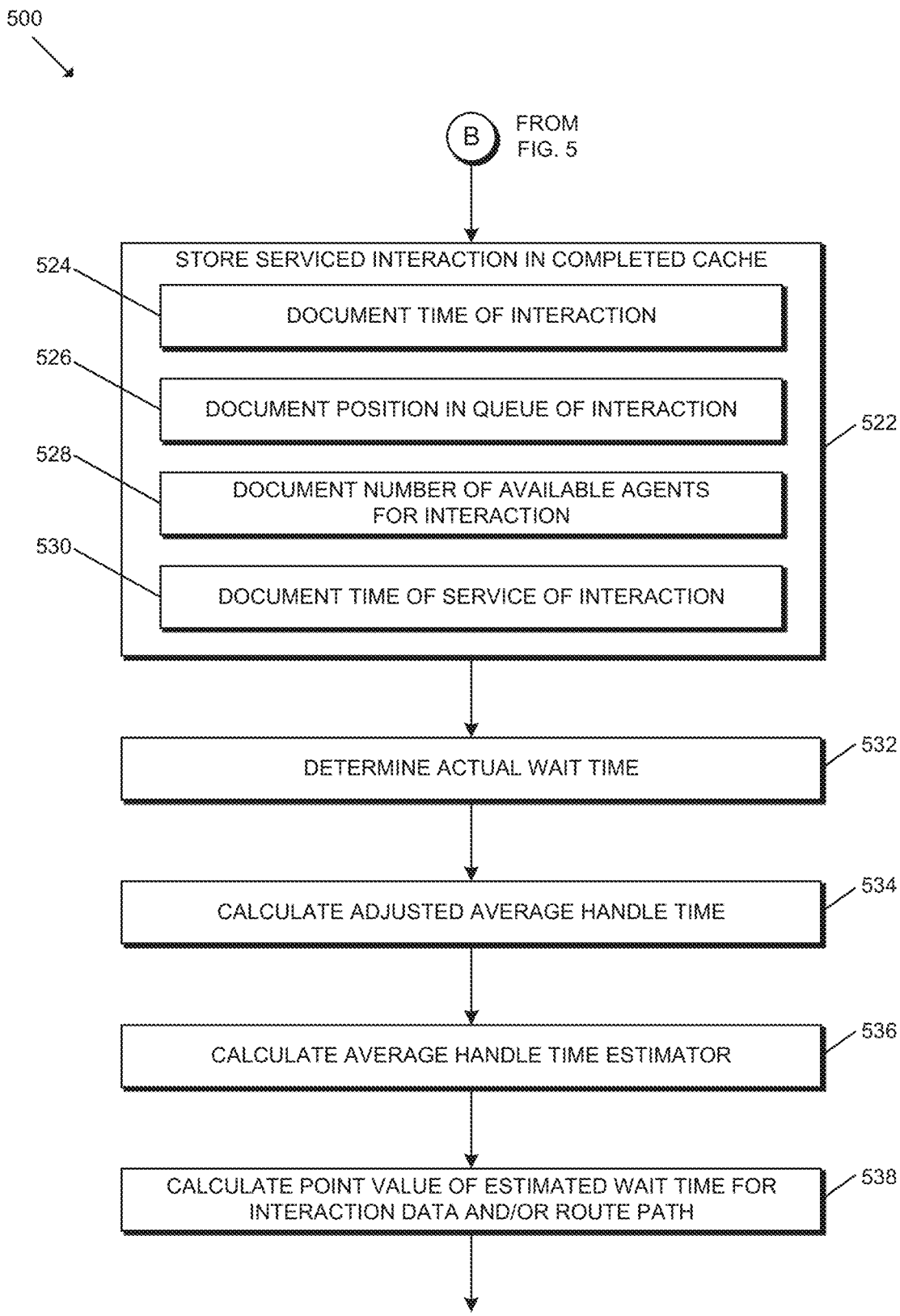
FIG. 6 is a simplified flow diagram of the method of FIG. 5 that includes calculating a point value of estimated wait time.

Referring now to FIGS. 5 and 6, in use, a system may execute a method 500 of estimating contact center wait time. It should be appreciated that, in some embodiments, the system may be embodied as a computing device (e.g., the computing device 1100 of FIG. 11) and/or a contact center system (e.g., the contact center system 1000 of FIG. 10) or a system/device thereof. Furthermore, it should also be appreciated that the particular blocks of the method 500 are illustrated by way of example, and such blocks may be combined or divided, added or removed, and/or reordered in whole or in part depending on the particular embodiment, unless stated to the contrary.

At a high level, for each wait time estimation request received in method 500 (i.e., in block 502), the system tracks the service time of recently completed requests/serviced interactions in a history table (e.g., the completed cache). It should be appreciated that the history table may be database or a temporary caching mechanism, for example. Upon receipt of a new request, the history table is used to compute an estimate for the request. When the request has been completed and the interaction has been serviced, the measured service time of that interaction is updated in the history table. Not all requests incoming through the system will be monitored, as many requests are not subject to wait times. Such requests do not contribute to the wait time predictions of future requests and are not added to the history table. As will be evident from the discussion that follows, only requests associated with wait time estimations are included in the history table.

According to relationships (3)-(6) mentioned above, in at least some embodiments, the system stores the applicable interaction data from the wait time estimation request to infer future predictions of EWT for each unique queue and media type combination. As mentioned above, that interaction data may include (i) queue and media type of the interaction, (ii) position in queue of the interaction, (iii) number of agents servicing the queue at the time of request, (iv) time of request, and (v) time of service.

As further discussed below, in the illustrative embodiment, the system maintains two caches. One cache (i.e., the waiting cache) stores all the information about estimation wait time requests for interactions which have yet to be serviced. The other cache (i.e., the completed cache) stores information for interactions which have already been serviced and are no longer waiting in the queue.

It should be appreciated from the foregoing discussion that to calculate the adjusted wait time, the actual wait time needs to be determined, at least in some embodiments. More specifically, for each interaction entering the queue, the interaction data corresponding to that interaction will be captured and stored in the waiting cache. At the same time, at least in some embodiments, the state of all previous request(s) will be updated to reflect whether the request(s) have been processed or are still waiting in the queue.

For each interaction that has been processed, the time of the interaction entering service ($T_{service}$) will be recorded to compute the actual wait time (AWT) by subtracting from it the initial time of arrival into the queue or the time when a wait time estimation request was received ($T_{request}$). As such, the actual wait time may be expressed and/or determined according to relationship (9) below.

$$\text{Actual Wait Time (AWT)} = T_{service} - T_{request} \qquad (9)$$

Those interactions that have been serviced and have an actual wait time will then be moved from the waiting cache to the completed cache. Interactions that either abandon or flow out to other queue(s) are removed from the waiting cache and will not be added to the completed cache.

To make a prediction, interaction data is retrieved from the completed cache. Based on the retrieved data, the adjusted AHT ($AHT_i^{adj}$) of those interactions can be computed according to relationship (4) and a final value for the AHT estimator ($AHT\hat{\,}$) can be derived according to relationship (5). Finally, the prediction for wait time for the request can be calculated according to relationship (6). The amount or number of interactions to be retrieved from the cache depends on the capacity of the cache, as well as effect and relevancy of past interactions.

The illustrative method 500 begins with block 502 as shown in FIG. 5. In block 502, the system receives a request to estimate wait time for an interaction that has been placed in the waiting queue. In some embodiments, placement of interaction data for a particular interaction in the waiting queue may serve as, or otherwise correspond to, a wait time estimation request. From block 502, the method 500 proceeds to block 504.

In block 504, the system stores the interaction data associated with the request (i.e., from block 502) in a waiting cache. In the illustrative embodiment, to perform block 504, the system performs blocks 506, 508, 510. In block 506, the system documents the time of storage of the request to estimate wait time and the associated interaction data in the waiting cache. In block 508, the system documents the position in queue of the particular request and the associated interaction data. In block 510, the system documents the number of agents available at the time of the particular request and the associated interaction. From block 504, the method 500 proceeds to block 512.

In block 512, the system receives status updates for one or more previous requests and associated interactions. In the illustrative embodiment, updates received in block 512 include updates based on measured service times of serviced interactions. From block 512, the method 500 proceeds to block 514.

In block 514, the system determines whether the interaction associated with the request received in block 502 has been serviced by one or more agents. In response to a determination by the system in block 514 that the interaction has been serviced, the method 500 proceeds to block 522.

As shown in FIG. 6, in block 522, the system stores the serviced interaction data in a completed cache. In the illustrative embodiment, to perform block 522, the system performs blocks 524, 526, 528, 530. In block 524, the system documents the time of storage of the request and the serviced interaction in the completed cache. In block 526, the system documents the position in queue of the serviced interaction. In block 528, the system documents the number of agents available at the time of the serviced interaction. In block 530, the system documents the time of service of the completed interaction. From block 522, the method 500 proceeds to block 532.

In block 532, based on the information documented in block 522, the system determines the actual wait time for the serviced interaction according to relationship (9). From block 532, the method 500 proceeds to block 534.

In block 534, according to relationship (4), the system calculates the adjusted average handle time based on the determination made in block 532. From block 534, the method 500 proceeds to block 536.

In block 536, according to relationship (5), the system calculates the average handle time estimator based on the calculation performed in block 534. From block 536, the method 500 proceeds to block 538.

In block 538, according to relationship (6), the system calculates a point value of estimated wait time for specific interaction data and/or a specific route path based on the calculation performed in block 536.

Returning to block 514, if the system determines in block 514 that the interaction associated with the request received in block 502 has not been serviced by one or more agents, the method 500 proceeds to block 516.

In block 516, the system determines whether the interaction yet to be serviced has been abandoned. In response to a determination by the system in block 516 that the interaction yet to be serviced has been abandoned, the method 500 proceeds to block 518.

In block 518, the system evicts the interaction yet to be serviced from the waiting cache.

Returning to block 516, if the system determines in block 516 that the interaction yet to be serviced has not been abandoned, the method 500 proceeds to block 520.

In block 520, the system determines whether the interaction has an actual wait time of less than 1 second, which may indicate short abandonment of the interaction. In response to a determination by the system in block 520 that the interaction has an actual wait time of less than 1 second, the method 500 proceeds to block 518. However, in response to a determination by the system in block 520 that the interaction does not have an actual wait time of less than 1 second, the method 500 returns to block 504.

Although the blocks 502-538 are described in a relatively serial manner, it should be appreciated that various blocks of the method 500 may be performed in parallel in some embodiments.

Figure 7:
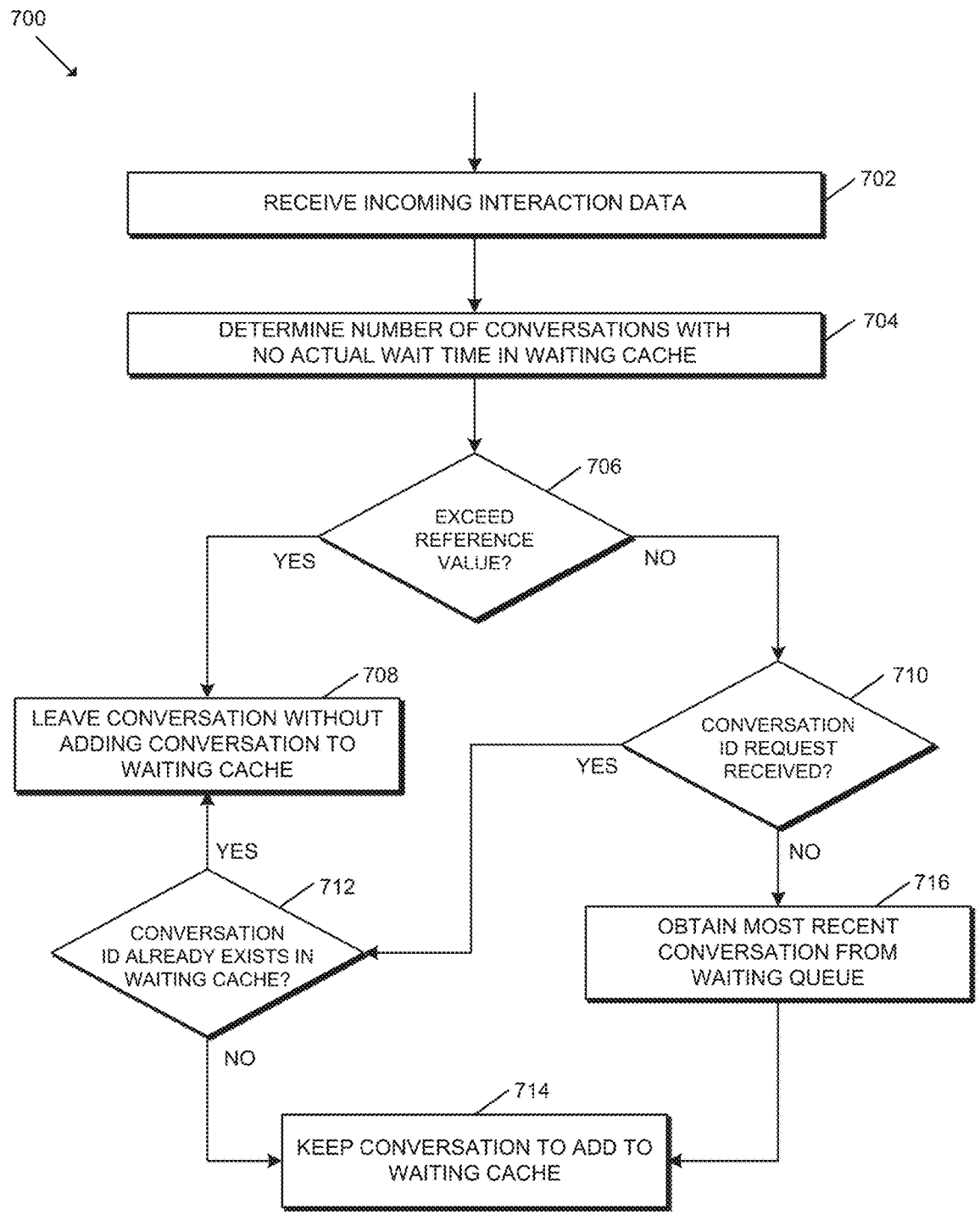
FIG. 7 is a simplified flow diagram of at least one embodiment of a method of controlling the number of contact center interactions added to a waiting cache.

Referring now to FIG. 7, in use, a system may execute a method 700 of controlling the number of contact center interactions added to the waiting cache. It should be appreciated that, in some embodiments, the system may be embodied as a computing device (e.g., the computing device 1100 of FIG. 11) and/or a contact center system (e.g., the contact center system 1000 of FIG. 10) or a system/device thereof. Furthermore, it should also be appreciated that the particular blocks of the method 700 are illustrated by way of example, and such blocks may be combined or divided, added or removed, and/or reordered in whole or in part depending on the particular embodiment, unless stated to the contrary.

Ideally, cache capacity would be infinite to allow all interactions to be captured and subsequently tracked. However, in a real contact center environment where resources are limited, controlling the capacity of the cache to a certain level may be beneficial to minimize resources and reduce customer wait times.

It should be appreciated that interaction data is stored in the waiting cache based on the type of the interaction, among other things. To maintain prediction accuracy, the system operates to keep unique interactions in the waiting cache. In doing so, every time a request and the associated interaction data have arrived, the system will check if the interaction is already present in the waiting cache to ensure the addition of only unique interactions. At the same time, if the cache reaches the maximum capacity threshold, the current request will not be added to the waiting cache.

It should also be appreciated that there are types of interactions with low actual wait time, such as the interactions with an AWT of less than one second discussed above with reference to block 520, for example. In addition to those interactions, interactions that have been abandoned (e.g., the abandoned interactions discussed above with reference to block 516) and interactions that have flowed out of the waiting cache or been transferred to another queue or media type will be evicted from the waiting cache. Such interactions will not be added to the completed cache even if they have entered service. At the end of each wait time prediction, the system will notify that a prediction was performed. A separate process will subscribe to and archive these predictions for accuracy analysis.

The illustrative method 700 begins with block 702 as shown in FIG. 7 in which the system receives incoming interaction data from one or more customers. The incoming interaction data received in block 702 may be similar to the incoming interaction data received in block 102. From block 702, the method 700 proceeds to block 704.

In block 704, the system determines the number of conversations or interactions in the waiting queue that have no actual wait time. From block 704, the method 700 proceeds to block 706.

In block 706, the system determines whether the number of conversations or interactions determined in block 704 exceeds a reference value. In some embodiments, the reference value may define a capacity limit of the waiting cache for interactions having low actual wait time or no actual wait time. In response to a determination by the system in block 706 that the number of conversations or interactions exceeds the reference value, the method 700 proceeds to block 708.

In block 708, the system leaves the incoming conversation or interaction without adding the incoming conversation or interaction to the waiting cache.

Returning to block 706, if the system determines in block 706 that the number of conversations or interactions determined in block 704 does not exceeds the reference value, the method 700 proceeds to block 710.

In block 710, the system determines whether a conversation ID request for the incoming conversation or interaction has been received. In response to a determination by the system in block 710 that the conversation ID request has been received, the method 700 proceeds to block 712.

In block 712, the system determines whether the conversation ID associated with the request received in block 710 already exists in the waiting cache. In response to a determination by the system in block 712 that the conversation ID already exists in the waiting cache, the method 700 proceeds to block 708.

Returning to block 710, if the system determines in block 710 that the conversation ID request has not been received, the method 700 proceeds to block 716.

In block 716, the system obtains the most recent conversation or interaction from the waiting queue. From block 716, the method 700 proceeds to block 714.

In block 714, the system keeps the most recent conversation or interaction from the waiting queue and adds the conversation or interaction to the waiting cache.

Returning to block 712, if the system determines in block 712 that the conversation ID does not already exist in the waiting cache, the method 700 proceeds to block 714.

Although the blocks 702-716 are described in a relatively serial manner, it should be appreciated that various blocks of the method 700 may be performed in parallel in some embodiments.

Figure 8:
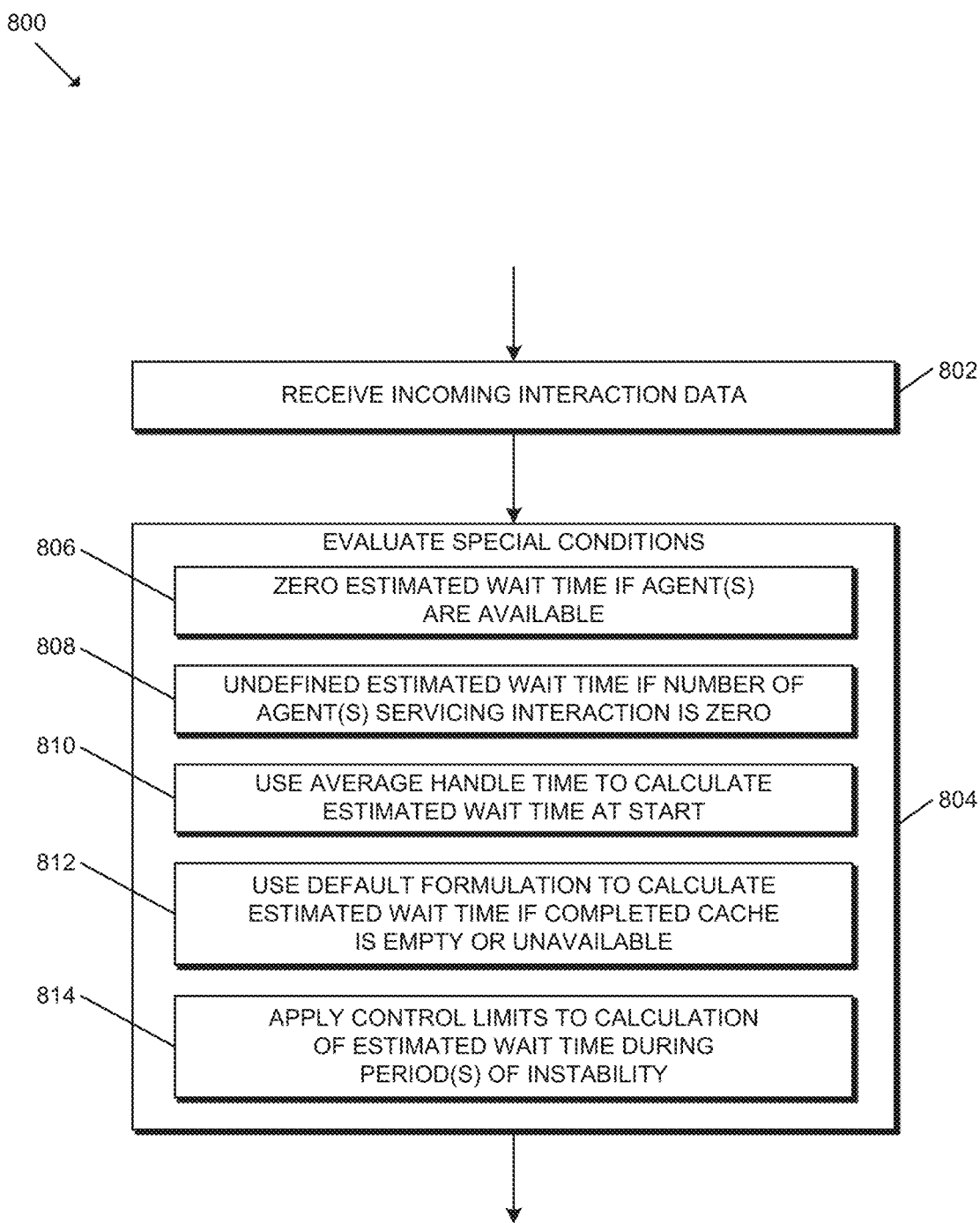
FIG. 8 is a simplified flow diagram of at least one embodiment of a method of evaluating special conditions when estimating contact center wait time.

Referring now to FIG. 8, in use, a system may execute a method 800 of evaluating special conditions when estimating contact center wait time. It should be appreciated that, in some embodiments, the system may be embodied as a computing device (e.g., the computing device 1100 of FIG. 11) and/or a contact center system (e.g., the contact center system 1000 of FIG. 10) or a system/device thereof. Furthermore, it should also be appreciated that the particular blocks of the method 800 are illustrated by way of example, and such blocks may be combined or divided, added or removed, and/or reordered in whole or in part depending on the particular embodiment, unless stated to the contrary.

During each wait time estimation request and subsequent prediction, certain considerations may apply for special conditions. Those considerations include, but are not limited to, the following: (i) zero estimated wait time (EWT) when there are idle available agents to service an interaction; (ii) undefined estimated wait time when the number of available agents to service an interaction is zero; (iii) the use of the average handle time (AHT) (i.e., rather than the adjusted AHT) to calculate EWT when the system starts; (iv) the use of a default formulation to calculate EWT when the completed cache is empty or unavailable; and (v) the application of control limits to the estimated wait time calculation during periods of instability.

It should be appreciated that the completed cache (which stores historical interaction data for previously serviced interactions) is used to improve the accuracy and precision of the EWT prediction, and therefore that availability of the completed cache is important. When the completed cache is not available or is completely empty, EWT predictions may be calculated according to relationship (2). In the case where some variables included in relationship (2) are also absent or unavailable, the wait time of the current longest waiting interaction will be returned as the prediction.

The illustrative method 800 begins with block 802 as shown in FIG. 8 in which the system receives incoming interaction data from one or more customers. The incoming interaction data received in block 802 may be similar to the incoming interaction data received in block 102. From block 802, the method 800 proceeds to block 804.

In block 804, the system evaluates the presence (or absence) of certain special conditions. To do so, in the illustrative embodiment, the system performs blocks 806, 808, 810, 812, 814. In block 806, the system evaluates the presence of a special condition in which the EWT prediction is zero due to idle agent(s) being available. In block 808, the system evaluates the presence of a special condition in which the EWT prediction is undefined due to zero agents being available to service the interaction. In block 810, the system evaluates the presence of a special condition in which average handle time (AHT) is used for the EWT prediction upon initial startup of the system. In block 812, the system evaluates the presence of a condition in which a default formulation (i.e., relationship (2)) is used to make the EWT prediction due to the waiting cache being empty or unavailable. In block 814, the system evaluates the presence of a condition in which control limits are applied to the EWT prediction due to periods of instability. The control limits are discussed in greater detail below with reference to FIG. 9.

Although the blocks 802-814 are described in a relatively serial manner, it should be appreciated that various blocks of the method 800 may be performed in parallel in some embodiments.

Figure 9:
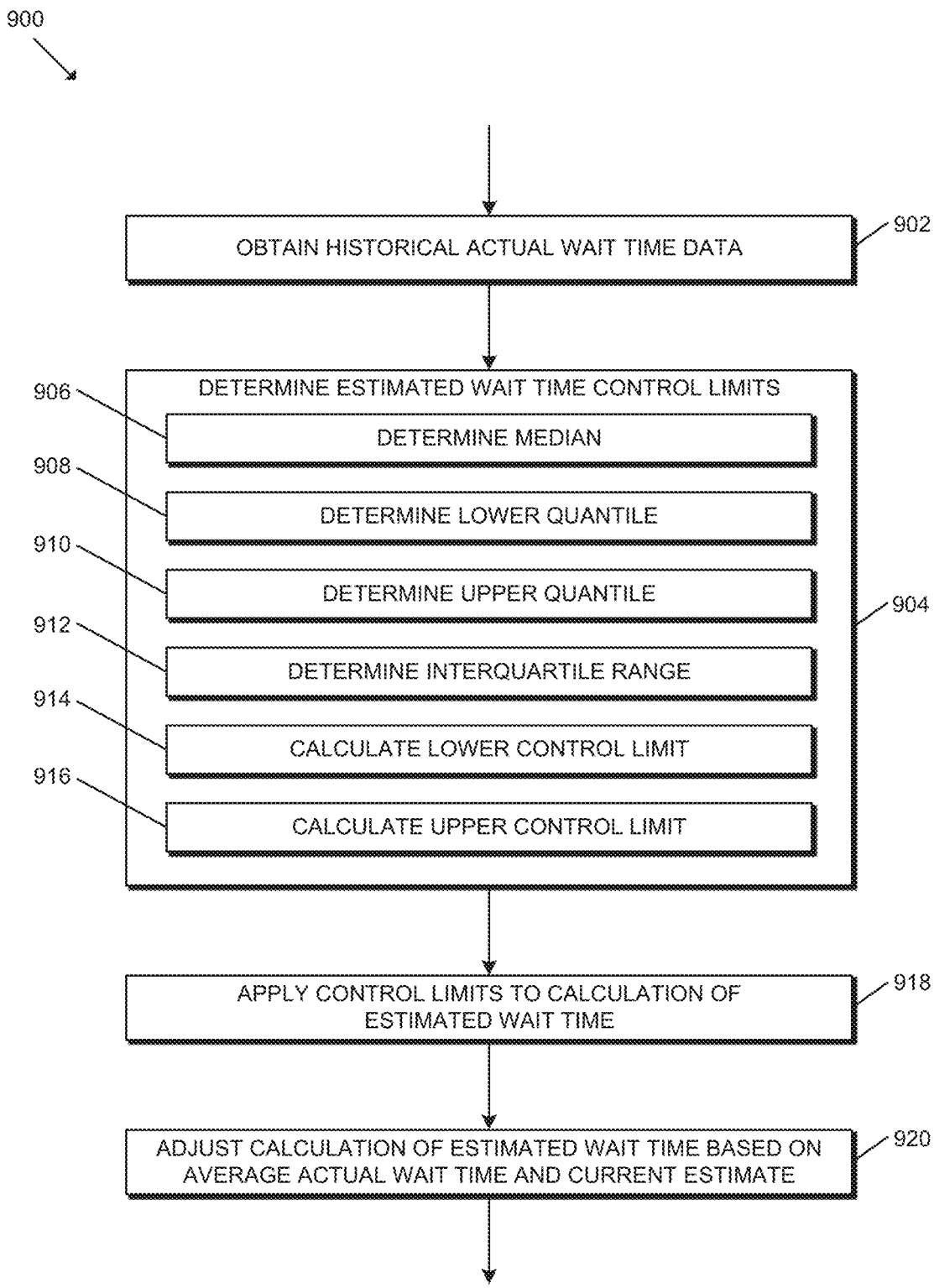
FIG. 9 is a simplified flow diagram of at least one embodiment of a method of applying control limits when estimating contact center wait time.

Referring now to FIG. 9, in use, a system may execute a method 900 of applying control limits when estimating contact center wait time. It should be appreciated that, in some embodiments, the system may be embodied as a computing device (e.g., the computing device 1100 of FIG. 11) and/or a contact center system (e.g., the contact center system 1000 of FIG. 10) or a system/device thereof. Furthermore, it should also be appreciated that the particular blocks of the method 900 are illustrated by way of example, and such blocks may be combined or divided, added or removed, and/or reordered in whole or in part depending on the particular embodiment, unless stated to the contrary.

When making a prediction, certain situations may arise when the inputs to the formulation do not follow the general trend. Often, such situations arise when the system is highly chaotic and unstable. In some cases, the situations occur at the beginning of a shift or during times when staff level changes rapidly. To avoid affecting the prediction outcomes in a negative way, bounds and control limits may be used to provide more sensible predictions within an established statistical range.

The statistical range may be formed from the actual wait time (AWT) of past interactions. Given an ordered set of past interactions wait time S{Wait Time}, the upper and lower limit can be derived from the following mathematical relationships:

$$\text{Median} = S\left[\frac{1}{2}(n+1)\right] \quad (10)$$

$$\text{Quantile } Q1 = S\left[\frac{1}{4}(n+1)\right] \quad (11)$$

$$\text{Quantile } Q3 = S\left[\frac{3}{4}(n+1)\right] \quad (12)$$

-continued $$IQR = Q3 - Q1 \quad (13)$$

$$\text{Lower Limit} = \text{Median} - 1.5 \ IQR \quad (14)$$

$$\text{Upper Limit} = \text{Median} + 1.5 \ IQR \quad (15)$$

Once the upper and lower limits are determined, the EWT prediction may be bound according to the following mathematical relationship:

$$\text{Lower Limit} <= EWT <= \text{Upper Limit} \quad (16)$$

In some embodiments, in addition to, or as an alternative to, calculation of control limits based on the relationships (10)-(16), wait time for an interaction stored in the waiting cache may be used as a component of the final EWT prediction. In one example, the EWT prediction (i.e., during periods of instability) may be based on a percentage of the average actual wait time (AWT) taken from historical data stored in the completed cache and a percentage of the current EWT prediction corresponding to periods of normal operation. In at least some embodiments, the EWT prediction during periods of instability may be expressed and/or determined according to the following mathematical relationship:

$$EWT_{instability} = 0.75 * \text{Average Actual Wait Time} + 0.25 * EWT_{normal} \quad (17)$$

The illustrative method 900 begins with block 902 in which the system obtains historical actual wait time data (e.g., from the completed cache) during a period of instability. From block 902, the method 900 proceeds to block 904.

In block 904, the system determines control limits for the EWT prediction. In at least some embodiments, the control limits are determined according to relationships (10)-(15). Regardless, in the illustrative embodiment, to perform block 904, the system performs blocks 906, 908, 910, 912, 914, 916. In block 906, the system determines a median based on an ordered set of previously serviced interactions (e.g., based on relationship (10)). In block 908, the system determines a lower quantile (e.g., based on relationship (11)) for the set of previously serviced interactions. In block 910, the system determines an upper quantile (e.g., based on relationship (12)) for the set of previously serviced interactions. In block 912, the system determines an interquartile range (IQR) (e.g., based on relationship (13)) for the set of previously serviced interactions. In block 914, the system calculates a lower control limit (e.g., based on relationship (14)) for the set of previously serviced interactions. In block 916, the system calculates an upper control limit (e.g., based on relationship (15)) for the set of previously serviced interactions. From block 904, the method 900 proceeds to block 918.

In block 918, the system applies the control limits determined in block 904 to the EWT prediction. More specifically, at least in some embodiments, in block 918, the system bounds the EWT prediction (e.g., based on relationship (16)) according to the control limits determined in block 904. From block 918, the method 900 proceeds to block 920.

In block 920, the system adjusts the EWT calculation based on the average actual wait time and the current EWT prediction corresponding to periods of normal operation. In some embodiments, in block 920, the system determines a wait time estimation during the period of instability ($EWT_{instability}$) according to relationship (17). Additionally, in some embodiments, block 920 may be performed by the system in lieu or, and/or as an alternative to, performance of blocks 904 and 918. Further, in some embodiments, block 920 may be omitted from the method 900.

Although the blocks 902-920 are described in a relatively serial manner, it should be appreciated that various blocks of the method 900 may be performed in parallel in some embodiments.

In certain scenarios, the underlying assumptions of position in queue, agent pool, and adjusted AHT, as well as other properties of an interaction, may change and therefore result in an EWT prediction value that is different from the initial prediction value. One such scenario may be a change in staff scenario in which the service time of interactions are lengthy, or during a scenario of high load and/or understaffing. Another scenario may be when eligibility conditions for the interaction change due to changes in skills set, language, priority etc.

In such scenarios, to provide an accurate EWT prediction, periodic wait time estimate updates may be provided to the queued interactions using the updated position in queue, as well as the pool of available agents and the dynamically changing AHT estimator (AHT^). Another way of providing a more accurate EWT prediction initially is to anticipate the changes and incorporate the changed parameters in the initial wait time predictions. In the case of changing staffing level (shift), if the agent shift is known a priori, the staffing information could be incorporated by recursively adjusting the agent number with respect to the estimated wait time until they reach an equilibrium.

Figure 10:
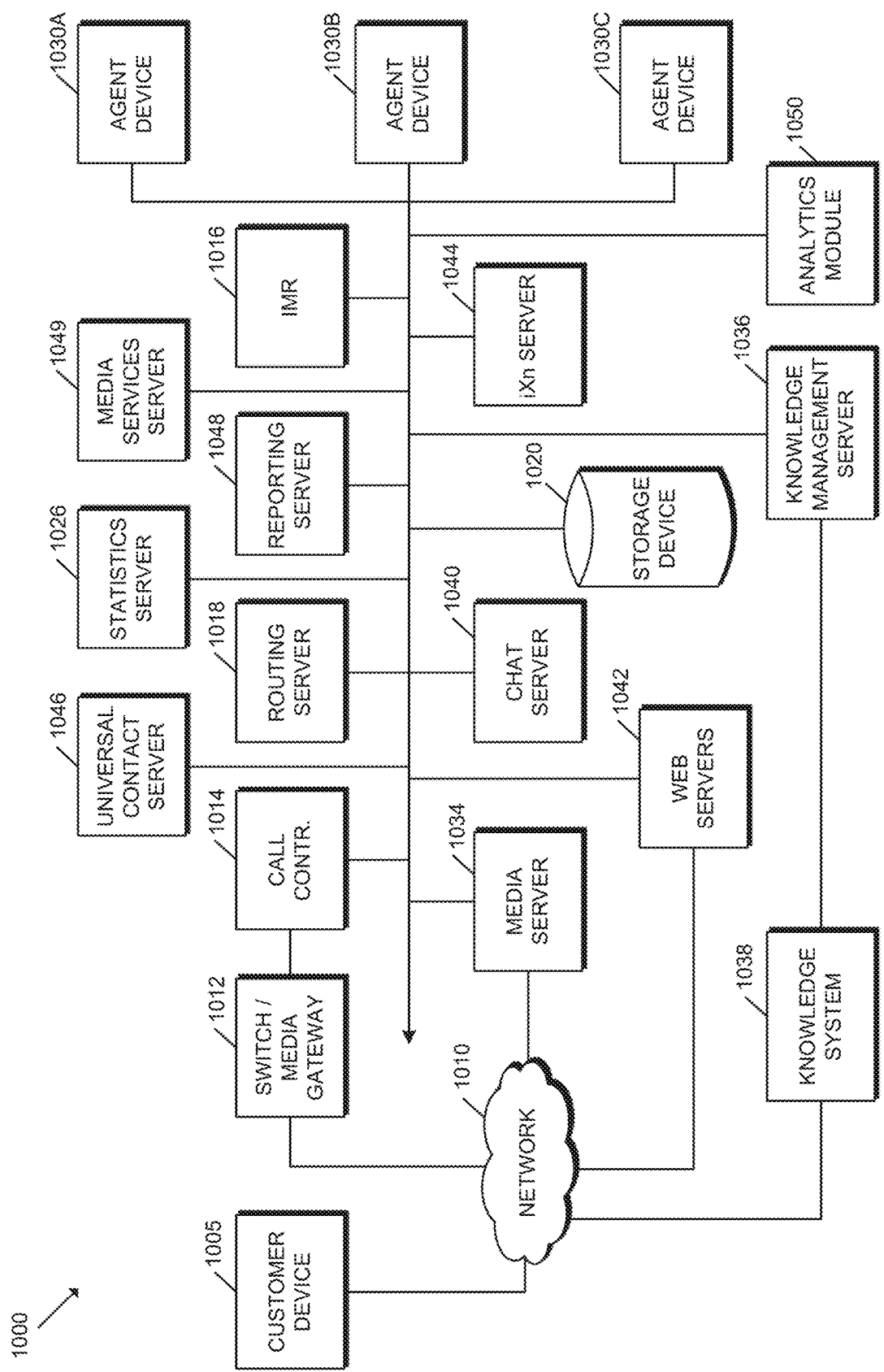
FIG. 10 is a simplified block diagram of at least one embodiment of a contact center system.

Referring now to FIG. 10, a simplified block diagram of at least one embodiment of a communications infrastructure and/or contact center system, which may be used in conjunction with one or more of the embodiments described herein, is shown. The contact center system 1000 may be embodied as any system capable of providing contact center services (e.g., call center services, chat center services, SMS center services, etc.) to an end user and otherwise performing the functions described herein. The illustrative contact center system 1000 includes a customer device 1005, a network 1010, a switch/media gateway 1012, a call controller 1014, an interactive media response (IMR) server 1016, a routing server 1018, a storage device 1020, a statistics server 1026, agent devices 1030A, 1030B, 1030C, a media server 1034, a knowledge management server 1036, a knowledge system 1038, chat server 1040, web servers 1042, an interaction (iXn) server 1044, a universal contact server 1046, a reporting server 1048, a media services server 1049, and an analytics module 1050. Although only one customer device 1005, one network 1010, one switch/media gateway 1012, one call controller 1014, one IMR server 1016, one routing server 1018, one storage device 1020, one statistics server 1026, one media server 1034, one knowledge management server 1036, one knowledge system 1038, one chat server 1040, one iXn server 1044, one universal contact server 1046, one reporting server 1048, one media services server 1049, and one analytics module 1050 are shown in the illustrative embodiment of FIG. 10, the contact center system 1000 may include multiple customer devices 1005, networks 1010, switch/media gateways 1012, call controllers 1014, IMR servers 1016, routing servers 1018, storage devices 1020, statistics servers 1026, media servers 1034, knowledge management servers 1036, knowledge systems 1038, chat servers 1040, iXn servers 1044, universal contact servers 1046, reporting servers 1048, media services servers 1049, and/or analytics modules 1050 in other embodiments. Further, in some embodiments, one or more of the components described herein may be excluded from the system 1000, one or more of the components described as being independent may form a portion of another component, and/or one or more of the component described as forming a portion of another component may be independent.

It should be understood that the term "contact center system" is used herein to refer to the system depicted in FIG. 10 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 1000), the associated customer service provider (such as a particular customer service provider providing customer services through the contact center system 1000), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 1000 may be used by a customer service provider to provide various types of services to customers. For example, the contact center system 1000 may be used to engage and manage interactions in which automated processes (or bots) or human agents communicate with customers. As should be understood, the contact center system 1000 may be an in-house facility to a business or enterprise for performing the functions of sales and customer service relative to products and services available through the enterprise. In another embodiment, the contact center system 1000 may be operated by a third-party service provider that contracts to provide services for another organization. Further, the contact center system 1000 may be deployed on equipment dedicated to the enterprise or third-party service provider, and/or deployed in a remote computing environment such as, for example, a private or public cloud environment with infrastructure for supporting multiple contact centers for multiple enterprises. The contact center system 1000 may include software applications or programs, which may be executed on premises or remotely or some combination thereof. It should further be appreciated that the various components of the contact center system 1000 may be distributed across various geographic locations and not necessarily contained in a single location or computing environment.

It should further be understood that, unless otherwise specifically limited, any of the computing elements of the technologies described herein may be implemented in cloud-based or cloud computing environments. As used herein and further described below in reference to the computing device 1100, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

Figure 11:
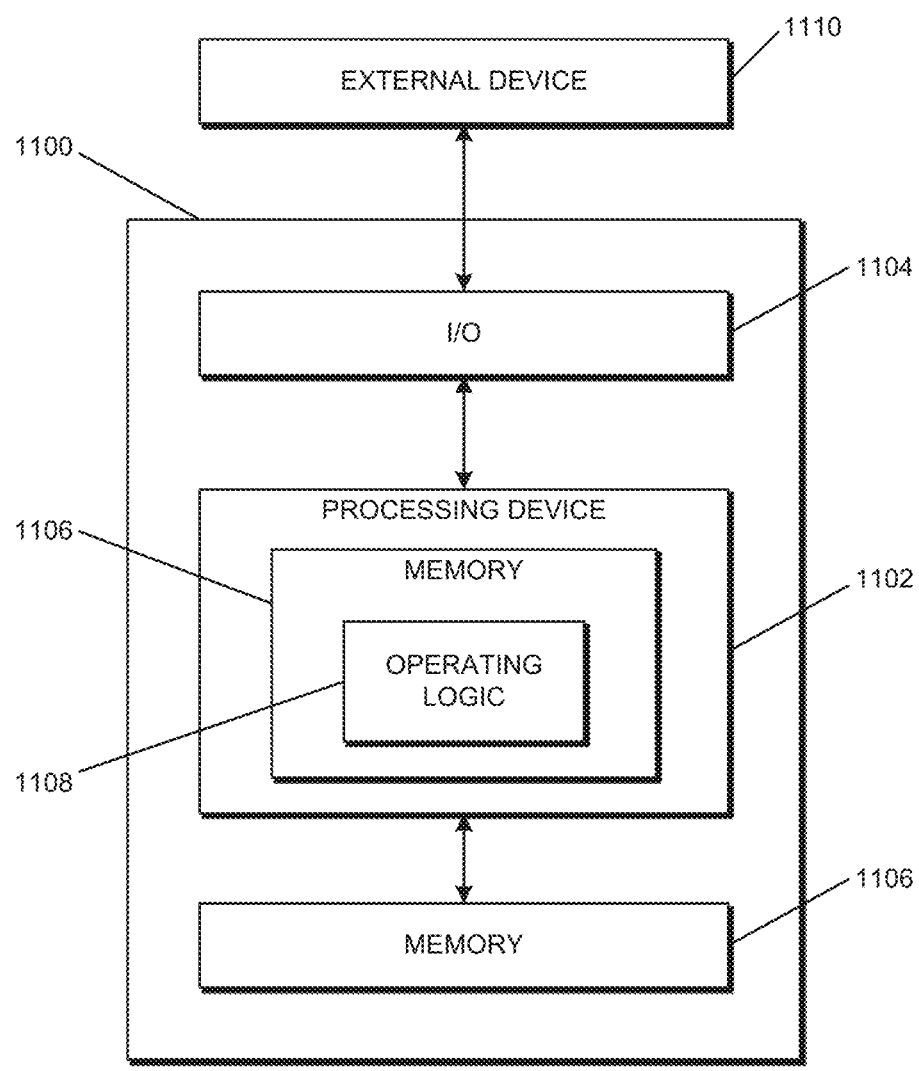
FIG. 11 is a simplified block diagram of at least one embodiment of a computing device.

It should be understood that any of the computer-implemented components, modules, or servers described in relation to FIG. 10 may be implemented via one or more types of computing devices, such as, for example, the computing device 1100 of FIG. 11. As will be seen, the contact center system 1000 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 1000 may initiate inbound communications (e.g., telephone calls, emails, chats, etc.) to the contact center system 1000 via a customer device 1005. While FIG. 10 shows one such customer device—i.e., customer devices 1005—it should be understood that any number of customer devices 1005 may be present. The customer devices 1005, for example, may be a communication device, such as a telephone, smart phone, computer, tablet, or laptop. In accordance with functionality described herein, customers may generally use the customer devices 1005 to initiate, manage, and conduct communications with the contact center system 1000, such as telephone calls, emails, chats, text messages, web-browsing sessions, and other multimedia transactions.

Inbound and outbound communications from and to the customer devices 1005 may traverse the network 1010, with the nature of the network typically depending on the type of customer device being used and the form of communication. As an example, the network 1010 may include a communication network of telephone, cellular, and/or data services. The network 1010 may be a private or public switched telephone network (PSTN), local area network (LAN), private wide area network (WAN), and/or public WAN such as the Internet. Further, the network 1010 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 1012 may be coupled to the network 1010 for receiving and transmitting telephone calls between customers and the contact center system 1000. The switch/media gateway 1012 may include a telephone or communication switch configured to function as a central switch for agent level routing within the center. The switch may be a hardware switching system or implemented via software. For example, the switch 1012 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 1030. Thus, in general, the switch/media gateway 1012 establishes a voice connection between the customer and the agent by establishing a connection between the customer device 1005 and agent device 1030.

As further shown, the switch/media gateway 1012 may be coupled to the call controller 1014 which, for example, serves as an adapter or interface between the switch and the other routing, monitoring, and communication-handling components of the contact center system 1000. The call controller 1014 may be configured to process PSTN calls, VoIP calls, and/or other types of calls. For example, the call controller 1014 may include computer-telephone integration (CTI) software for interfacing with the switch/media gateway and other components. The call controller 1014 may include a session initiation protocol (SIP) server for processing SIP calls. The call controller 1014 may also extract data about an incoming interaction, such as the customer's telephone number, IP address, or email address, and then communicate these with other contact center components in processing the interaction.

The interactive media response (IMR) server 1016 may be configured to enable self-help or virtual assistant functionality. Specifically, the IMR server 1016 may be similar to an interactive voice response (IVR) server, except that the IMR server 1016 is not restricted to voice and may also cover a variety of media channels. In an example illustrating voice, the IMR server 1016 may be configured with an IMR script for querying customers on their needs. For example, a contact center for a bank may instruct customers via the IMR script to "press 1" if they wish to retrieve their account balance. Through continued interaction with the IMR server 1016, customers may receive service without needing to speak with an agent. The IMR server 1016 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment (e.g. Genesys® Designer).

The routing server 1018 may function to route incoming interactions. For example, once it is determined that an inbound communication should be handled by a human agent, functionality within the routing server 1018 may select the most appropriate agent and route the communication thereto. This agent selection may be based on which available agent is best suited for handling the communication. More specifically, the selection of appropriate agent may be based on a routing strategy or algorithm that is implemented by the routing server 1018. In doing this, the routing server 1018 may query data that is relevant to the incoming interaction, for example, data relating to the particular customer, available agents, and the type of interaction, which, as described herein, may be stored in particular databases. Once the agent is selected, the routing server 1018 may interact with the call controller 1014 to route (i.e., connect) the incoming interaction to the corresponding agent device 1030. As part of this connection, information about the customer may be provided to the selected agent via their agent device 1030. This information is intended to enhance the service the agent is able to provide to the customer.

It should be appreciated that the contact center system 1000 may include one or more mass storage devices—represented generally by the storage device 1020—for storing data in one or more databases relevant to the functioning of the contact center. For example, the storage device 1020 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 1020 may store agent data in an agent database. Agent data maintained by the contact center system 1000 may include, for example, agent availability and agent profiles, schedules, skills, handle time, and/or other relevant data. As another example, the storage device 1020 may store interaction data in an interaction database. Interaction data may include, for example, data relating to numerous past interactions between customers and contact centers. More generally, it should be understood that, unless otherwise specified, the storage device 1020 may be configured to include databases and/or store data related to any of the types of information described herein, with those databases and/or data being accessible to the other modules or servers of the contact center system 1000 in ways that facilitate the functionality described herein. For example, the servers or modules of the contact center system 1000 may query such databases to retrieve data stored therein or transmit data thereto for storage. The storage device 1020, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 1026 may be configured to record and aggregate data relating to the performance and operational aspects of the contact center system 1000. Such information may be compiled by the statistics server 1026 and made available to other servers and modules, such as the reporting server 1048, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 1030 of the contact center system 1000 may be communication devices configured to interact with the various components and modules of the contact center system 1000 in ways that facilitate functionality described herein. An agent device 1030, for example, may include a telephone adapted for regular telephone calls or VoIP calls. An agent device 1030 may further include a computing device configured to communicate with the servers of the contact center system 1000, perform data processing associated with operations, and interface with customers via voice, chat, email, and other multimedia communication mechanisms according to functionality described herein. Although FIG. 10 shows three such agent devices 1030—i.e., agent devices 1030A, 1030B and 1030C—it should be understood that any number of agent devices 1030 may be present in a particular embodiment.

The multimedia/social media server 1034 may be configured to facilitate media interactions (other than voice) with the customer devices 1005 and/or the servers 1042. Such media interactions may be related, for example, to email, voice mail, chat, video, text-messaging, web, social media, co-browsing, etc. The multi-media/social media server 1034 may take the form of any IP router conventional in the art with specialized hardware and software for receiving, processing, and forwarding multi-media events and communications.

The knowledge management server 1036 may be configured to facilitate interactions between customers and the knowledge system 1038. In general, the knowledge system 1038 may be a computer system capable of receiving questions or queries and providing answers in response. The knowledge system 1038 may be included as part of the contact center system 1000 or operated remotely by a third party. The knowledge system 1038 may include an artificially intelligent computer system capable of answering questions posed in natural language by retrieving information from information sources such as encyclopedias, dictionaries, newswire articles, literary works, or other documents submitted to the knowledge system 1038 as reference materials. As an example, the knowledge system 1038 may be embodied as IBM Watson or a similar system.

The chat server 1040, it may be configured to conduct, orchestrate, and manage electronic chat communications with customers. In general, the chat server 1040 is configured to implement and maintain chat conversations and generate chat transcripts. Such chat communications may be conducted by the chat server 1040 in such a way that a customer communicates with automated chatbots, human agents, or both. In exemplary embodiments, the chat server 1040 may perform as a chat orchestration server that dispatches chat conversations among the chatbots and available human agents. In such cases, the processing logic of the chat server 1040 may be rules driven so to leverage an intelligent workload distribution among available chat resources. The chat server 1040 further may implement, manage, and facilitate user interfaces (UIs) associated with the chat feature, including those UIs generated at either the customer device 1005 or the agent device 1030. The chat server 1040 may be configured to transfer chats within a single chat session with a particular customer between automated and human sources such that, for example, a chat session transfers from a chatbot to a human agent or from a human agent to a chatbot. The chat server 1040 may also be coupled to the knowledge management server 1036 and the knowledge systems 1038 for receiving suggestions and answers to queries posed by customers during a chat so that, for example, links to relevant articles can be provided.

The web servers 1042 may be included to provide site hosts for a variety of social interaction sites to which customers subscribe, such as Facebook, Twitter, Instagram, etc. Though depicted as part of the contact center system 1000, it should be understood that the web servers 1042 may be provided by third parties and/or maintained remotely. The web servers 1042 may also provide webpages for the enterprise or organization being supported by the contact center system 1000. For example, customers may browse the webpages and receive information about the products and services of a particular enterprise. Within such enterprise webpages, mechanisms may be provided for initiating an interaction with the contact center system 1000, for example, via web chat, voice, or email. An example of such a mechanism is a widget, which can be deployed on the webpages or websites hosted on the web servers 1042. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 1044 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 1044 may be configured to interact with the routing server 1018 for selecting an appropriate agent to handle each of the deferrable activities. Once assigned to a particular agent, the deferrable activity is pushed to that agent so that it appears on the agent device 1030 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 1030 may include a workbin. As an example, a workbin may be maintained in the buffer memory of the corresponding agent device 1030.

The universal contact server (UCS) 1046 may be configured to retrieve information stored in the customer database and/or transmit information thereto for storage therein. For example, the UCS 1046 may be utilized as part of the chat feature to facilitate maintaining a history on how chats with a particular customer were handled, which then may be used as a reference for how future chats should be handled. More generally, the UCS 1046 may be configured to facilitate maintaining a history of customer preferences, such as preferred media channels and best times to contact. To do this, the UCS 1046 may be configured to identify data pertinent to the interaction history for each customer such as, for example, data related to comments from agents, customer communication history, and the like. Each of these data types then may be stored in the customer database or on other modules and retrieved as functionality described herein requires.

The reporting server 1048 may be configured to generate reports from data compiled and aggregated by the statistics server 1026 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 1049 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 1050 may be configured to provide systems and methods for performing analytics on data received from a plurality of different data sources as functionality described herein may require. In accordance with example embodiments, the analytics module 1050 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the technologies described hereinto tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 1050 may have access to the data stored in the storage device 1020, including the customer database and agent database. The analytics module 1050 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 1050 may be configured to retrieve data stored within the storage device 1020 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 1050 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 1050 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 10 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the technologies described herein. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact center system 1000 may be affected through user interfaces (UIs) which may be generated on the customer devices 1005 and/or the agent devices 1030. As already noted, the contact center system 1000 may operate as a hybrid system in which some or all components are hosted remotely, such as in a cloud-based or cloud computing environment. It should be appreciated that each of the devices of the contact center system 1000 may be embodied as, include, or form a portion of one or more computing devices similar to the computing device 1100 described below in reference to FIG. 11.

Referring now to FIG. 11, a simplified block diagram of at least one embodiment of a computing device 1100 is shown. The illustrative computing device 1100 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 1100, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 1000 of FIG. 10—the various servers and computer devices thereof may be located on local computing devices 1100 (e.g., on-site at the same physical location as the agents of the contact center), remote computing devices 1100 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 1100 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 1100 includes a processing device 1102 that executes algorithms and/or processes data in accordance with operating logic 1108, an input/output device 1104 that enables communication between the computing device 1100 and one or more external devices 1110, and memory 1106 which stores, for example, data received from the external device 1110 via the input/output device 1104.

The input/output device 1104 allows the computing device 1100 to communicate with the external device 1110. For example, the input/output device 1104 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 1100 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 1100. The input/output device 1104 may include hardware, software, and/or firmware suitable for performing the techniques described herein.

The external device 1110 may be any type of device that allows data to be inputted or outputted from the computing device 1100. For example, in various embodiments, the external device 1110 may be embodied as one or more of the devices/systems described herein, and/or a portion thereof. Further, in some embodiments, the external device 1110 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 1110 may be integrated into the computing device 1100.

The processing device 1102 may be embodied as any type of processor(s) capable of performing the functions described herein. In particular, the processing device 1102 may be embodied as one or more single or multi-core processors, microcontrollers, or other processor or processing/controlling circuits. For example, in some embodiments, the processing device 1102 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 1102 may be a programmable type, a dedicated hardwired state machine, or a combination thereof. Processing devices 1102 with multiple processing units may utilize distributed, pipelined, and/or parallel processing in various embodiments. Further, the processing device 1102 may be dedicated to performance of just the operations described herein, or may be utilized in one or more additional applications. In the illustrative embodiment, the processing device 1102 is programmable and executes algorithms and/or processes data in accordance with operating logic 1108 as defined by programming instructions (such as software or firmware) stored in memory 1106. Additionally or alternatively, the operating logic 1108 for processing device 1102 may be at least partially defined by hardwired logic or other hardware. Further, the processing device 1102 may include one or more components of any type suitable to process the signals received from input/output device 1104 or from other components or devices and to provide desired output signals. Such components may include digital circuitry, analog circuitry, or a combination thereof.

The memory 1106 may be of one or more types of non-transitory computer-readable media, such as a solid-state memory, electromagnetic memory, optical memory, or a combination thereof. Furthermore, the memory 1106 may be volatile and/or nonvolatile and, in some embodiments, some or all of the memory 1106 may be of a portable type, such as a disk, tape, memory stick, cartridge, and/or other suitable portable memory. In operation, the memory 1106 may store various data and software used during operation of the computing device 1100 such as operating systems, applications, programs, libraries, and drivers. It should be appreciated that the memory 1106 may store data that is manipulated by the operating logic 1108 of processing device 1102, such as, for example, data representative of signals received from and/or sent to the input/output device 1104 in addition to or in lieu of storing programming instructions defining operating logic 1108. As shown in FIG. 11, the memory 1106 may be included with the processing device 1102 and/or coupled to the processing device 1102 depending on the particular embodiment. For example, in some embodiments, the processing device 1102, the memory 1106, and/or other components of the computing device 1100 may form a portion of a system-on-a-chip (SoC) and be incorporated on a single integrated circuit chip.

In some embodiments, various components of the computing device 1100 (e.g., the processing device 1102 and the memory 1106) may be communicatively coupled via an input/output subsystem, which may be embodied as circuitry and/or components to facilitate input/output operations with the processing device 1102, the memory 1106, and other components of the computing device 1100. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 1100 may include other or additional components, such as those commonly found in a typical computing device (e.g., various input/output devices and/or other components), in other embodiments. It should be further appreciated that one or more of the components of the computing device 1100 described herein may be distributed across multiple computing devices. In other words, the techniques described herein may be employed by a computing system that includes one or more computing devices. Additionally, although only a single processing device 1102, I/O device 1104, and memory 1106 are illustratively shown in FIG. 11, it should be appreciated that a particular computing device 1100 may include multiple processing devices 1102, I/O devices 1104, and/or memories 1106 in other embodiments. Further, in some embodiments, more than one external device 1110 may be in communication with the computing device 1100.

The computing device 1100 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 1100 may communicate with other computing devices 1100 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 1100 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

Figure 12:
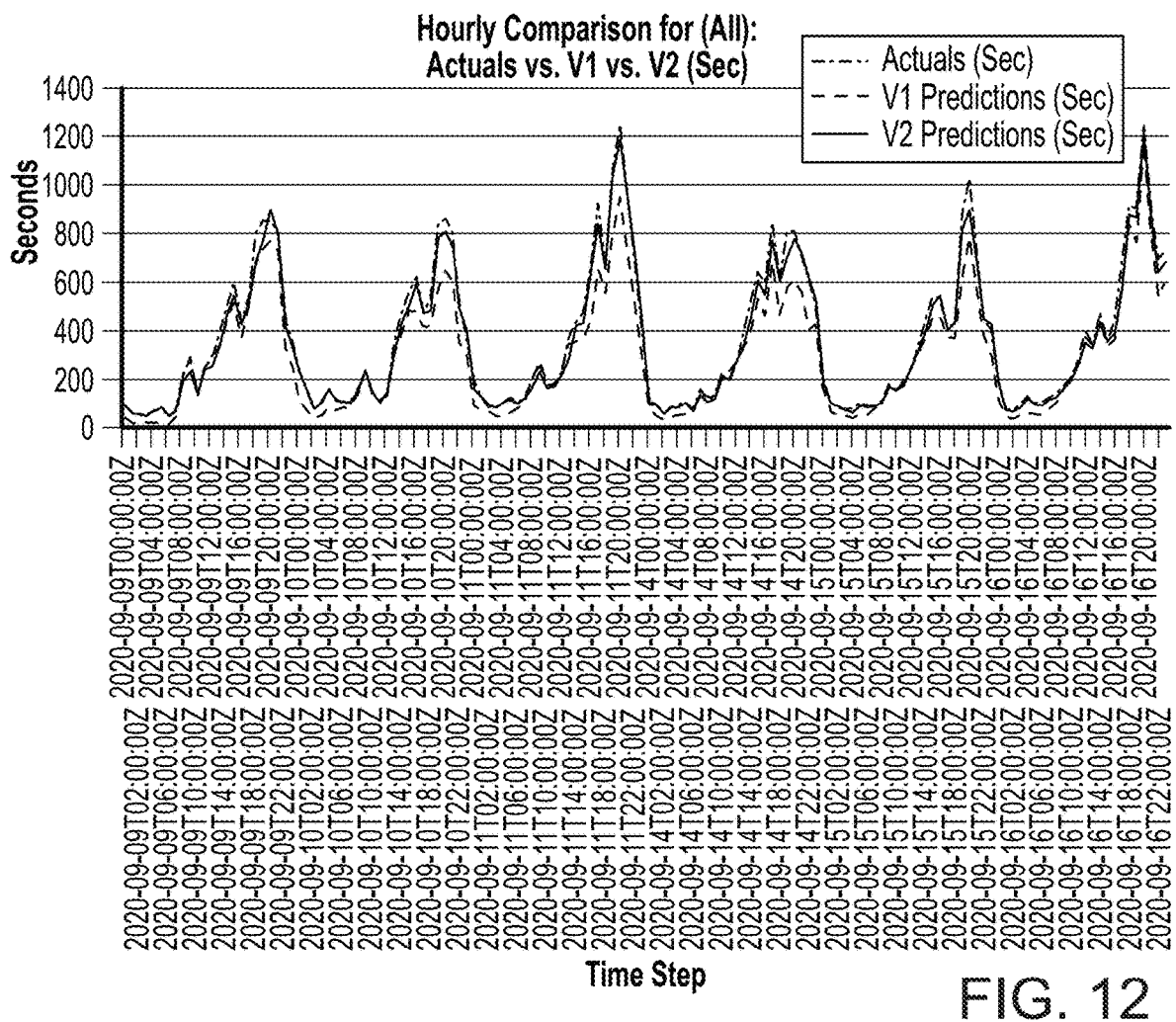
FIG. 12 is a graphical comparison of wait time estimations according to at least one method of the present disclosure and wait time estimations according to at least one conventional method.

Referring now to FIG. 12, a robust estimation system was tested with observations from 73 queues from a contact center setting such that wait time estimations for 338,084 conversations were performed within a period of 7 days. The actual wait times were recorded as the baseline to compare estimates made using the industrial standard formulation to estimates made using the robust estimation system. The comparison depicted in FIG. 12 is an aggregated hourly average comparison. It was found that the robust estimation system follows the actual average wait time better, whereas the industrial standard formulation underestimates the actual average wait time most of the time.

Figure 13:
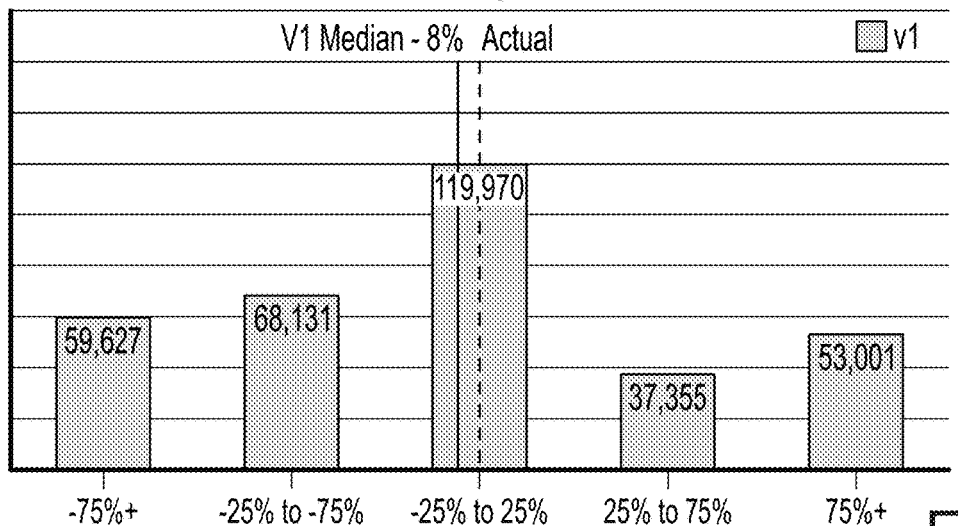
FIG. 13 is a chart-based depiction of a distribution of wait time estimations according to at least one conventional method.
Figure 14:
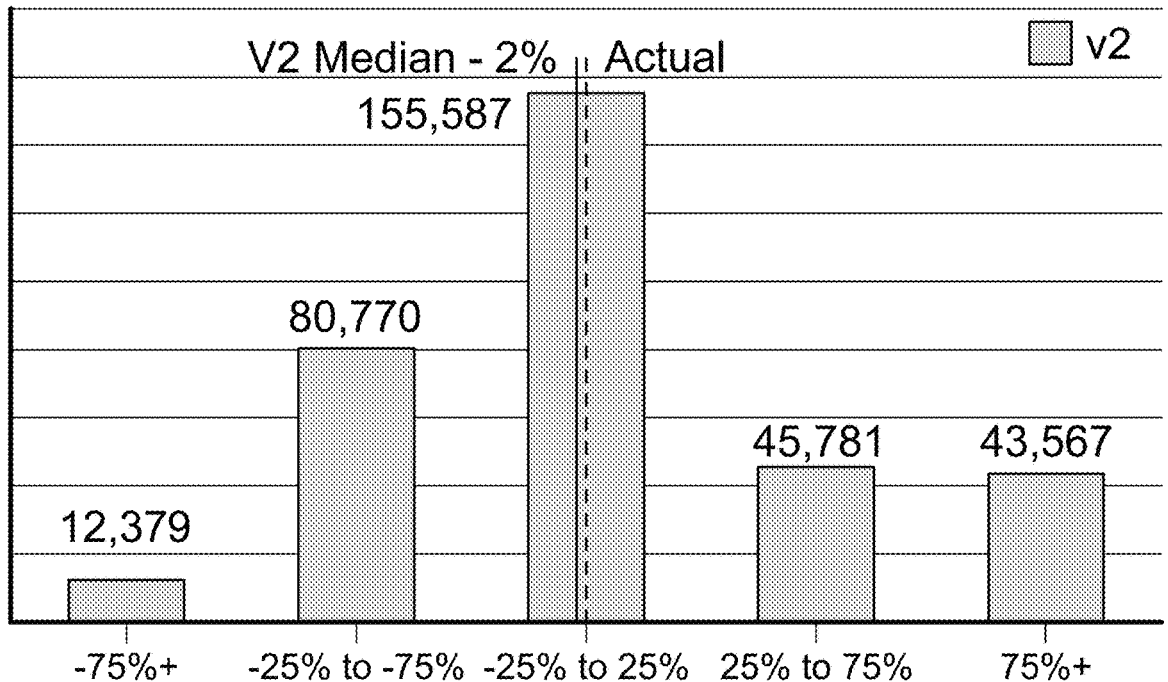
FIG. 14 is a chart-based depiction of a distribution of wait time estimations according to at least one method of the present disclosure.

Referring now to FIGS. 13 and 14, a distribution bar chart of both industry standard and robust estimation predictions error bucketing the results to 5 buckets (−75% and below, −25% to −75%, −25% to +25%, +25% to 75%, and 75% and above) is shown. As shown in FIGS. 13 and 14, it is observed that the robust estimation system produces an accuracy distribution that is much more centered with 46% of observations falling in between −25% to +25% accuracy, whereas only 34% of the industry standard estimation falls in the same accuracy band. Furthermore, the median percentage error of the robust estimation system is only −2% off compare to the industry standard of −8%.

Figure 15:
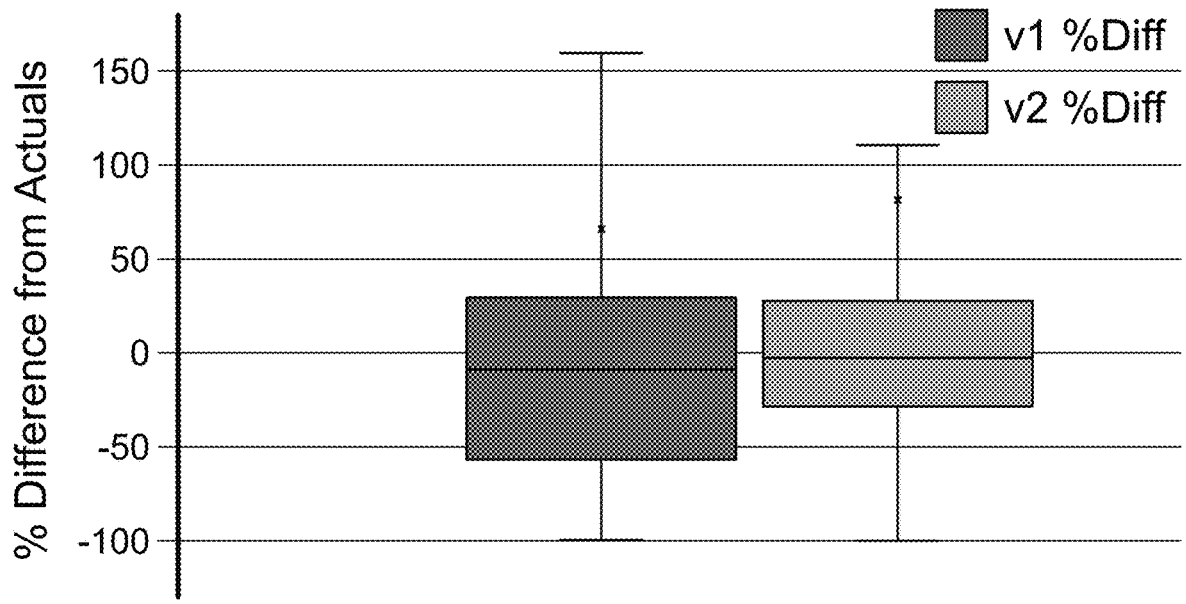
FIG. 15 is a box plot comparison of precision of wait time estimations according to at least one method of the present disclosure and precision of wait time estimations according to at least one conventional method.

Referring now to FIG. 15, that figure shows the measures of central tendency of both of the approaches in a box plot, which further confirms that the robust estimation system is both more accurate and precise in estimating the wait time compared to the industrial standard approach.

What is claimed is:

1. A system for estimating a wait time to connect a customer to an agent, the system comprising:
   at least one processor; and
   at least one memory comprising a plurality of instructions stored thereon that, in response to execution by the at least one processor, causes the system to:
   receive incoming interaction data from the customer indicative of a request to estimate the wait time;
   retrieve historical data indicative of interaction information for one or more interactions that have already been serviced in response to receipt of the request; and generate a wait time estimation based on the historical data, wherein to generate the wait time estimation based on the historical data comprises to:
- determine an actual wait time corresponding to one or more interactions that have already been serviced;
- determine a position in queue of one or more interactions that have already been serviced;
- determine a number of available agents corresponding to one or more interactions that have already been serviced; and
- calculate an adjusted average handle time corresponding to one or more interactions that have already been serviced based on the determined actual wait time, the determined position in queue, and the determined number of available agents.

2. The system of claim 1, wherein the interaction data includes a plurality of route paths each defined by one or more of a media type associated with the request, data stored in a queue that is associated with one or more previous interactions, a language associated with the request, one or more skill requirements associated with the request, a position of the request in the queue, a number of agents available to service the queue, a time of the request, or a time of service of the request.

3. The system of claim 2, wherein in response to execution by the at least one processor, the plurality of instructions further causes the system to:
- maintain a waiting cache for each of the plurality of route paths to store interaction data associated with one or more interactions that have yet to be serviced; and
- maintain a completed cache for each of the plurality of route paths to store interaction data associated with one or more interactions that have already been serviced.

4. The system of claim 1, wherein to generate the wait time estimation based on the historical data comprises to calculate an average handle time estimator based on one or more of a median of adjusted average handle time calculations or an average of adjusted average handle time calculations.

5. The system of claim 4, wherein to generate the wait time estimation based on the historical data comprises to:
- determine a position in queue corresponding to the request;
- determine a number of available agents corresponding to the request; and
- calculate the wait time estimation based on the average handle time estimator, the determined position in queue corresponding to the request, and the determined number of available agents corresponding to the request.

6. The system of claim 1, wherein to generate the wait time estimation based on the historical data comprises to calculate an estimation interval of wait time.

7. The system of claim 6, wherein to calculate the estimation interval of wait time comprises to:
- determine a sample number of one or more interactions that have already been serviced;
- determine a statistical significance level associated with the estimation interval;
- determine a quantile value for a lower bound of the estimation interval;
- determine a quantile value for an upper bound of the estimation interval;
- calculate the lower bound of the estimation interval based at least partially on an adjusted average handle time corresponding to the determined lower bound quantile value; and
- calculate the upper bound of the estimation interval based at least partially on an adjusted average handle time corresponding to the determined upper bound quantile value.

8. A system for estimating a wait time to connect a customer to an agent, the system comprising:
- at least one processor; and
- at least one memory comprising a plurality of instructions stored thereon that, in response to execution by the at least one processor, causes the system to:
  - receive incoming interaction data from the customer indicative of a request to estimate the wait time;
  - retrieve historical data indicative of interaction information for one or more interactions that have already been serviced in response to receipt of the request; and
  - generate a wait time estimation based on the historical data;
- wherein in response to execution by the at least one processor, the plurality of instructions further causes the system to:
  - determine whether a number of conversations stored in a waiting cache having no actual wait time exceeds a reference value;
  - determine whether a conversation identifier associated with an incoming conversation already exists in the waiting cache; and
  - exclude the incoming conversation from the waiting cache in response to a determination that the number of conversations stored in the waiting cache having no actual wait time exceeds the reference value or in response to a determination that the conversation identifier already exists in the waiting cache.

9. One or more non-transitory machine-readable storage media comprising a plurality of instructions stored thereon that, in response to execution by at least one processor, causes a system to:
- receive incoming interaction data from a customer indicative of a request to estimate a wait time to connect the customer to an agent;
- retrieve historical data indicative of interaction information for one or more interactions that have already been serviced in response to receipt of the request; and
- generate a wait time estimation based on the historical data to connect the customer to the agent, wherein to generate the wait time estimation based on the historical data comprises to calculate an estimation interval of wait time, and wherein to calculate the estimation interval of wait time comprises to:
  - determine a sample number of one or more interactions that have already been serviced;
  - determine a statistical significance level associated with the estimation interval;
  - determine a quantile value for a lower bound of the estimation interval;
  - determine a quantile value for an upper bound of the estimation interval;
  - calculate the lower bound of the estimation interval based at least partially on an adjusted average handle time corresponding to the determined lower bound quantile value; and
  - calculate the upper bound of the estimation interval based at least partially on an adjusted average handle time corresponding to the determined upper bound quantile value.

10. The one or more non-transitory machine-readable storage media of claim 9, wherein the interaction data includes a plurality of route paths each defined by one or more of a media type associated with the request, data stored in a queue that is associated with one or more previous interactions, a language associated with the request, one or more skill requirements associated with the request, a position of the request in the queue, a number of agents available to service the queue, a time of the request, or a time of service of the request.

11. The one or more non-transitory machine-readable storage media of claim 9, wherein to generate the wait time estimation based on the historical data comprises to:
  determine an actual wait time corresponding to one or more interactions that have already been serviced;
  determine a position in queue of one or more interactions that have already been serviced;
  determine a number of available agents corresponding to one or more interactions that have already been serviced; and
  calculate an adjusted average handle time corresponding to one or more interactions that have already been serviced based on the determined actual wait time, the determined position in queue, and the determined number of available agents.

12. The one or more non-transitory machine-readable storage media of claim 11, wherein to generate the wait time estimation based on the historical data comprises to calculate an average handle time estimator based on one or more of a median of adjusted average handle time calculations or an average of adjusted average handle time calculations.

13. The one or more non-transitory machine-readable storage media of claim 12, wherein to generate the wait time estimation based on the historical data comprises to:
  determine a position in queue corresponding to the request;
  determine a number of available agents corresponding to the request; and
  calculate the wait time estimation based on the average handle time estimator, the determined position in queue corresponding to the request, and the determined number of available agents corresponding to the request.

14. The one or more non-transitory machine-readable storage media of claim 9, wherein in response to execution by the at least one processor, the plurality of instructions further causes the system to:
  determine whether a number of conversations stored in a waiting cache having no actual wait time exceeds a reference value;
  determine whether a conversation identifier associated with an incoming conversation already exists in the waiting cache; and
  exclude the incoming conversation from the waiting cache in response to a determination that the number of conversations stored in the waiting cache having no actual wait time exceeds the reference value or in response to a determination that the conversation identifier already exists in the waiting cache.

* * * * *